(12) United States Patent
Ferlitsch

(10) Patent No.: US 7,480,068 B2
(45) Date of Patent: Jan. 20, 2009

(54) METHODS AND SYSTEMS FOR PAGE-INDEPENDENT SPOOL FILE SHEET ASSEMBLY

(75) Inventor: Andrew Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 911 days.

(21) Appl. No.: 09/894,928

(22) Filed: Jun. 28, 2001

(65) Prior Publication Data

US 2003/0007179 A1 Jan. 9, 2003

Related U.S. Application Data

(63) Continuation-in-part of application No. 09/681,409, filed on Mar. 30, 2001, now abandoned, which is a continuation-in-part of application No. 09/681,416, filed on Mar. 30, 2001, now Pat. No. 7,046,384, which is a continuation-in-part of application No. 09/681,208, filed on Feb. 22, 2001, now abandoned.

(60) Provisional application No. 60/261,132, filed on Jan. 11, 2001.

(51) Int. Cl.
G06F 15/00 (2006.01)

(52) U.S. Cl. ............... 358/1.16; 358/1.15; 358/1.18; 715/249

(58) Field of Classification Search ............ 358/1.15, 358/1.16, 1.1, 1.2, 1.13, 1.18; 709/220, 246; 715/205, 274, 243, 249, 251

See application file for complete search history.

(56) References Cited

U.S. PATENT DOCUMENTS

| 5,128,878 A | 7/1992 | Gore et al. |
| 5,241,397 A | 8/1993 | Yamada ............... 358/296 |
| 5,287,194 A | 2/1994 | Lobiondo ............. 358/296 |
| 5,467,434 A | 11/1995 | Hower et al. |
| 5,528,734 A | 6/1996 | Sanchez .............. 395/115 |
| 5,547,178 A | 8/1996 | Costello |
| 5,550,954 A | 8/1996 | Campbell et al. |
| 5,630,062 A | 5/1997 | Okutsu |
| 5,697,040 A | 12/1997 | Rabjohns et al. |
| 5,699,495 A | 12/1997 | Snipp |
| 5,822,500 A | 10/1998 | Utsunomiya et al. |
| 5,845,058 A | 12/1998 | Shaw et al. ........... 395/114 |

(Continued)

FOREIGN PATENT DOCUMENTS

EP 0738949 12/1996

(Continued)

OTHER PUBLICATIONS

U.S. Appl. No. 09/681,208—Office Action dated Jul. 19, 2007.

(Continued)

*Primary Examiner*—Kimberly A Williams
(74) *Attorney, Agent, or Firm*—Krieger Intellectual Property, Inc.; Scott C. Krieger

(57) ABSTRACT

Embodiments of the present invention comprise driver-independent, printer-independent systems and methods for sheet assembly. These embodiments may utilize a page-independent spool index file that may be manipulated to produce document sheet assembly options which may not be available through a system's hardware or drivers.

19 Claims, 18 Drawing Sheets

U.S. PATENT DOCUMENTS

| | | | |
|---|---|---|---|
| 5,859,711 A | 1/1999 | Barry et al. | 358/296 |
| 5,867,706 A | 2/1999 | Martin et al. | |
| 5,897,260 A | 4/1999 | Zingher | 400/719 |
| 5,918,988 A | 7/1999 | H.A.M. Van Oijen | |
| 5,940,186 A | 8/1999 | Barry et al. | |
| 5,960,168 A | 9/1999 | Shaw et al. | |
| 5,978,560 A | 11/1999 | Tan et al. | |
| 5,978,650 A | 11/1999 | Fischer et al. | 455/3.1 |
| 5,982,996 A | 11/1999 | Snyders | 395/114 |
| 5,995,721 A | 11/1999 | Rourke et al. | 395/114 |
| 5,995,723 A | 11/1999 | Sperry et al. | 395/114 |
| 6,049,394 A | 4/2000 | Fukushima | |
| 6,055,063 A | 4/2000 | Yang et al. | |
| 6,057,930 A * | 5/2000 | Blossey et al. | 358/1.15 |
| 6,078,960 A | 6/2000 | Ballard | |
| 6,088,120 A | 7/2000 | Shibusawa et al. | 358/1.15 |
| 6,101,508 A | 8/2000 | Wolff | |
| 6,118,546 A | 9/2000 | Sanchez et al. | |
| 6,148,346 A | 11/2000 | Hanson | |
| 6,157,465 A | 12/2000 | Suda et al. | 358/407 |
| 6,172,765 B1 * | 1/2001 | Kawamoto | 358/1.2 |
| 6,173,295 B1 | 1/2001 | Goertz et al. | |
| 6,229,622 B1 | 5/2001 | Takeda | 358/1.16 |
| 6,248,996 B1 | 6/2001 | Johnson et al. | 250/234 |
| RE37,258 E | 7/2001 | Patel et al. | 358/1.15 |
| 6,266,150 B1 | 7/2001 | Brossman et al. | 358/1.15 |
| 6,320,667 B1 | 11/2001 | Mitsuhashi | |
| 6,337,745 B1 | 1/2002 | Aiello, Jr. et al. | 358/1.15 |
| 6,348,971 B2 | 2/2002 | Owa et al. | |
| 6,348,972 B1 | 2/2002 | Taniguchi et al. | |
| 6,397,245 B1 | 5/2002 | Johnson et al. | |
| 6,452,692 B1 | 9/2002 | Yacoub | |
| 6,474,881 B1 | 11/2002 | Wanda | |
| 6,476,927 B1 | 11/2002 | Schwarz, Jr. | |
| 6,509,974 B1 | 1/2003 | Hansen | |
| 6,529,286 B1 | 3/2003 | King | |
| 6,552,813 B2 | 4/2003 | Yacoub | |
| 6,570,669 B1 | 5/2003 | Onuma | |
| 6,580,521 B1 | 6/2003 | Nishikawa et al. | |
| 6,584,503 B1 | 6/2003 | Carney et al. | |
| 6,609,210 B1 | 8/2003 | Onuma | |
| 6,618,167 B1 | 9/2003 | Shah | |
| 6,654,136 B2 | 11/2003 | Shimada | |
| 6,654,509 B2 | 11/2003 | Nishikawa et al. | |
| 6,661,531 B1 | 12/2003 | Murphy et al. | |
| 6,665,082 B1 | 12/2003 | Takeoka et al. | |
| 6,697,165 B2 | 2/2004 | Wakai et al. | |
| 6,700,678 B1 | 3/2004 | Luman | |
| 6,707,568 B1 | 3/2004 | Yu | |
| 6,724,494 B1 | 4/2004 | Danknick | |
| 6,748,471 B1 | 6/2004 | Keeney et al. | |
| 6,757,071 B1 | 6/2004 | Goodman et al. | |
| 6,816,270 B1 | 11/2004 | Cooper et al. | |
| 6,825,943 B1 * | 11/2004 | Barry et al. | 358/1.15 |
| 6,863,367 B2 | 3/2005 | Hamamoto et al. | |
| 6,981,632 B2 | 5/2005 | Schwartz | |
| 6,956,664 B1 | 10/2005 | Kutty | |
| 6,965,958 B1 | 11/2005 | Sugiyama | |
| 6,985,245 B1 | 1/2006 | Takahashi | |
| 7,031,014 B2 | 4/2006 | Ohwa | |
| 7,072,057 B1 | 7/2006 | Hansen | |
| 7,081,969 B1 | 7/2006 | Motomed et al. | |
| 7,084,998 B2 * | 8/2006 | Blair et al. | 358/1.15 |
| 7,139,085 B1 | 11/2006 | Sakaguchi | |
| 7,148,980 B2 | 12/2006 | Tominaga | |
| 7,155,669 B1 | 12/2006 | Nakagiri et al. | |
| 7,161,693 B2 * | 1/2007 | Kizaki et al. | 358/1.13 |
| 7,239,411 B2 | 7/2007 | Kelsey | |
| 2001/0038462 A1 | 11/2001 | Teeuwen et al. | 358/1.15 |
| 2002/0001495 A1 | 1/2002 | Mochizuki | |
| 2002/0027673 A1 | 3/2002 | Roosen et al. | |
| 2002/0042798 A1 | 4/2002 | Takei et al. | |
| 2002/0059489 A1 | 5/2002 | Davis et al. | |
| 2002/0060801 A1 | 5/2002 | Motomed et al. | |
| 2002/0101600 A1 | 8/2002 | Sabbagh et al. | |
| 2002/0101604 A1 | 8/2002 | Mima et al. | |
| 2002/0112037 A1 | 8/2002 | Koss | |
| 2002/0113989 A1 | 8/2002 | Ferlitsch et al. | |
| 2002/0138564 A1 | 9/2002 | Treptow et al. | |
| 2002/0163665 A1 | 11/2002 | Iwata et al. | |
| 2002/0186407 A1 | 12/2002 | Laughlin | |
| 2003/0002069 A1 | 1/2003 | Bhogal et al. | |
| 2003/0011812 A1 | 1/2003 | Sesek et al. | |
| 2003/0038964 A1 | 2/2003 | Ferlitsch | |
| 2003/0048472 A1 | 3/2003 | Perdu et al. | |
| 2003/0184782 A1 | 10/2003 | Perkins et al. | |
| 2004/0042042 A1 | 3/2004 | Utsunomiya | |
| 2004/0105122 A1 | 6/2004 | Schaeffer | |
| 2006/0033958 A1 | 2/2006 | d'Entrecasteaux | |
| 2006/0155825 A1 | 7/2006 | Torii | |

FOREIGN PATENT DOCUMENTS

| | | |
|---|---|---|
| JP | 64-014043 | 1/1989 |
| JP | 03282727 | 12/1991 |
| JP | 04-199218 | 7/1992 |
| JP | 04217550 | 8/1992 |
| JP | 05-270064 | 10/1993 |
| JP | 06-004239 | 1/1994 |
| JP | 07219731 | 8/1995 |
| JP | 08-101754 | 4/1996 |
| JP | 09-030040 | 2/1997 |
| JP | 09222964 | 8/1997 |
| JP | 09-319530 | 12/1997 |
| JP | 10-027149 | 1/1998 |
| JP | 10027076 | 1/1998 |
| JP | 10-031750 | 2/1998 |
| JP | 10154049 | 6/1998 |
| JP | 10-187393 | 7/1998 |
| JP | 10-207643 | 8/1998 |
| JP | 10240477 | 9/1998 |
| JP | 10-283130 | 10/1998 |
| JP | 10-340166 | 12/1998 |
| JP | 10-340167 | 12/1998 |
| JP | 11-015608 | 1/1999 |
| JP | 11-024860 | 1/1999 |
| JP | 11110143 | 4/1999 |
| JP | 11-143661 | 5/1999 |
| JP | 11219265 | 8/1999 |
| JP | 11296333 | 10/1999 |
| JP | 2000003258 | 1/2000 |
| JP | 2000-099303 | 4/2000 |
| JP | 2000-132347 | 5/2000 |
| JP | 2000-151873 | 5/2000 |
| JP | 2001071590 | 3/2001 |
| JP | 2001-088405 | 4/2001 |
| WO | WO01/31432 | 5/2001 |

OTHER PUBLICATIONS

U.S. Appl. No. 09/681,208—Office Action dated Jan. 8, 2007.
U.S. Appl. No. 09/681,208—Office Action dated Jul. 28, 2006.
U.S. Appl. No. 09/681,208—Office Action dated Jan. 12, 2006.
U.S. Appl. No. 09/681,208—Office Action dated May 4, 2005.
U.S. Appl. No. 09/681,208—Office Action dated Oct. 22, 2004.
U.S. Appl. No. 09/681,416—Office Action dated Aug. 11, 2005.
U.S. Appl. No. 09/681,416—Office Action dated Nov. 16, 2004.
U.S. Appl. No. 09/681,409—Office Action dated Aug. 11, 2006.
U.S. Appl. No. 09/681,409—Office Action dated Jan. 25, 2006.
U.S. Appl. No. 09/681,409—Office Action dated Jul. 29, 2005.
U.S. Appl. No. 09/681,409—Office Action dated Nov. 17, 2004.
U.S. Appl. No. 09/683,667—Office Action dated Apr. 15, 2008.
U.S. Appl. No. 09/683,667—Office Action dated Oct. 29, 2007.
U.S. Appl. No. 09/683,667—Office Action dated May 7, 2007.
U.S. Appl. No. 09/683,667—Office Action dated Nov. 17, 2006.

U.S. Appl. No. 09/683,667—Office Action dated Jun. 1, 2006.
U.S. Appl. No. 09/683,667—Office Action dated Dec. 13, 2005.
U.S. Appl. No. 09/683,667—Office Action dated Jun. 22, 2005.
U.S. Appl. No. 10/404,789—Office Action dated May 21, 2008.
U.S. Appl. No. 10/404,789—Office Action dated Nov. 28, 2007.
U.S. Appl. No. 10/404,789—Office Action dated Jul. 11, 2007.
U.S. Appl. No. 10/404,789—Office Action dated Feb. 6, 2007.
U.S. Appl. No. 10/404,789—Office Action dated Aug. 23, 2006.
U.S. Appl. No. 10/404,789—Office Action dated Mar. 15, 2006.
U.S. Appl. No. 10/404,789—Office Action dated Jul. 27, 2005.
U.S. Appl. No. 10/003,800—Office Action dated Apr. 20, 2006.
U.S. Appl. No. 10/003,800—Office Action dated Dec. 13, 2005.
U.S. Appl. No. 10/003,800—Office Action dated Jun. 15, 2005.
U.S. Appl. No. 09/683,162—Office Action dated Apr. 16, 2008.
U.S. Appl. No. 09/683,162—Office Action dated Oct. 29, 2007.
U.S. Appl. No. 09/683,162—Office Action dated May 17, 2007.
U.S. Appl. No. 09/683,162—Office Action dated Nov. 27, 2006.
U.S. Appl. No. 09/683,162—Office Action dated Jan. 10, 2006.
U.S. Appl. No. 09/683,162—Office Action dated Jun. 22, 2005.
U.S. Appl. No. 10/396,201—Office Action dated Jan. 23, 2007.
U.S. Appl. No. 09/964,985—Office Action dated Jan. 4, 2008.
U.S. Appl. No. 09/964,985—Office Action dated Jul. 17, 2007.
U.S. Appl. No. 09/964,985—Office Action dated Jan. 25, 2007.
U.S. Appl. No. 09/964,985—Office Action dated Aug. 10, 2006.
U.S. Appl. No. 09/964,985—Office Action dated Mar. 13, 2006.
U.S. Appl. No. 09/964,985—Office Action dated Sep. 13, 2005.
U.S. Appl. No. 09/932,661—Office Action dated Jun. 8, 2007.
U.S. Appl. No. 09/932,661—Office Action dated Jun 27, 2006.
U.S. Appl. No. 09/932,661—Office Action dated Nov. 28, 2005.
U.S. Appl. No. 09/932,661—Office Action dated May 4, 2005.
U.S. Appl. No. 10/002,781—Office Action dated Nov. 17, 2006.
U.S. Appl. No. 10/002,781—Office Action dated May 1, 2006.
U.S. Appl. No. 10/002,781—Office Action dated Nov. 28, 2005.
U.S. Appl. No. 10/002,781—Office Action dated Jun. 15, 2005.
U.S. Appl. No. 09/967,592—Office Action dated Jun. 12, 2008.
U.S. Appl. No. 09/967,592—Office Action dated Dec. 12, 2007.
U.S. Appl. No. 09/967,592—Office Action dated Jun. 27, 2007.
U.S. Appl. No. 09/967,592—Office Action dated Nov. 29, 2006.
U.S. Appl. No. 09/967,592—Office Action dated Jun. 15, 2006.
U.S. Appl. No. 09/967,592—Office Action dated Jan. 27, 2006.
U.S. Appl. No. 09/967,592—Office Action dated Aug. 10, 2005.
IBM AS/40 Printing V, Oct. 2000, http://www.redbooks.ibm.com/redbooks/pdfs/sg242160.pdf.
PostScript Language Document Structuring Conventions Specification, Version 3.0 Adobe Systems Incorporated, 1992.

* cited by examiner

METHODS AND SYSTEMS FOR PAGE-INDEPENDENT SPOOL FILE SHEET ASSEMBLY

CROSS REFERENCE TO RELATED APPLICATIONS

This application is a continuation-in-part (CIP) of two U.S. patent applications: U.S. patent application Ser. No. 09/681,409, filed Mar. 30, 2001, entitled "Methods and Systems for Print-Processor-Based Printer Status Detection and Print Task Distribution," invented by Andrew Rodney Ferlitsch, et al., now abandoned; and U.S. patent application Ser. No. 09/681,416, filed Mar. 30, 2001, entitled "Methods and Systems for Print-Processor-Based Print Task Error Recovery," invented by Andrew Rodney Ferlitsch, et al., now U.S. Pat. No. 7,046,384; both of which are continuation-in-part patent applications of U.S. patent application Ser. No. 09/681,208, filed Feb. 22, 2001, entitled "Methods and Systems for Print-Processor-Modified Printing," invented by Andrew Rodney Ferlitsch, et al., now abandoned; which claims the benefit of U.S. Provisional Patent Application Ser. No. 60/261,132, filed Jan. 11, 2001.

BACKGROUND

Modern printing devices offer a plethora of options for customizing printer output to a user's specific needs. Many printing devices provide customized sheet assembly features that allow a user to select the way information is printed on a page and the way pages are organized.

One option provided by some printing devices is "booklet" printing wherein pages are printed as if they were to be bound as a book. In booklet printing, information is printed on both sides of a page and margins are typically mirrored across adjacent pages. A larger margin is generally provided at the "inside" for binding. In the most common booklet printing format, two document pages are printed in landscape orientation on each side of a printed page thereby forming a booklet.

Another special printing option is "N-up" printing where multiple document pages are printed on a single sheet of print media. Two or more document pages may be printed on one physical page. This may be used to proof formatting, create outlines or other uses.

Yet another specialized printing option is "reverse order collation" wherein pages are printed in reverse order and collated. Many other options are available for specialized printer output.

These and other printing options are typically implemented through the use of custom print drivers, custom print processors or printer firmware. Special print drivers may be used to implement custom printing features, however print drivers are printer specific. Each printer or group of closely-related printers must have its own driver, therefore, implementing special features across a variety of printing devices requires the customization of a multitude of print drivers. Implementation of a new feature across the thousands of available printers today and new printers as they are introduced can be an endless task. Custom print processors are more portable and less device-specific. Some sheet assembly options are offered for EMF mode printing in a print processor provided in the Microsoft Windows 2000 DDK.

Special printing features may also be implemented as printer firmware. A firmware implementation typically requires a more expensive printer often containing a microprocessor and storage or memory. Printers with firmware support of custom features alleviate the need for driver support and storage on a host computer.

Systems and methods for providing custom sheet assembly and other special printing options without the inconvenience and expense of printer firmware or specialized drivers would be advantageous.

Many computing device platforms and printing systems are available today and embodiments of the present invention may be implemented with many of these systems, however, due to the prevalence of the Microsoft Windows® operating system family, embodiments used in conjunction with Windows® systems will be used to illustrate its functions. Accordingly, details of Microsoft Windows 95® and related Microsoft Windows® printing processes will be explained.

Microsoft Windows® operating systems typically employ two file types in the printing process. These file types are Enhanced Metafile (EMF) and raw format (raw) files.

Raw format files are device dependent files which are destined and formatted for a specific device. An example of a raw file is an encapsulated Postscript file, which is formatted to be interpreted by a Postscript printer. EMF files are device independent which contain graphic device interface (GDI) function calls that reproduce an application's graphic objects on a printer. EMF files are used to quickly record a printed document and return system control to a user. After control is returned to the user, the function calls stored in the EMF file may be executed and sent to the printer in the background.

Files may be recorded for later play back by using a spool file that is written and later despooled to a printing device. Spool files may be used for EMF and raw files. However, a print job may also be written directly to a printing device without using a spool file. Some typical printing process scenarios using raw spool files and EMF spool files are described below to introduce the elements and relationships of these processes and how they relate to embodiments of the present invention. These scenarios are derived from information contained in the Microsoft Windows 95® Driver Development Kit (DDK) documentation, the Microsoft Windows 2000® DDK documentation and the Microsoft Windows NT® DDK documentation.

A typical printing process scenario using a raw spool file may be described in reference to FIG. 1 wherein an application 10 initiates a print request 1 by calling a graphic device interface (GDI) 12. Application 10 may be a word processor, spreadsheet, browser, database program or some other program that runs on the underlying operating system. Typically, application 10 will create a device context (DC) and draw an object (i.e., a circle, a line, etc.) to the DC. The application 10 will then call the GDI with a print request directed to a particular printer 16 (FIG. 2) using that DC.

The GDI 12 will call the printer driver 14 associated with the particular printer 16 and request 2 instructions on how to render the object on that particular printer 16. The printer driver 14 will return 3 the instructions on how to render the object on the printer 16. In Windows 95®, used in this printing process example, the printer driver 14 is written in 16-bit code and communicates with a 16-bit GDI 12. This GDI will then pass the print request to a 32-bit GDI (GDI32) 18 to handle the 32-bit Windows 95® spooler process. GDI32 makes an interprocess call 5 to the spooler process 20.

Spooler process 20 calls 6 the router 22 to route the print job to printer 16. In this example, illustrated in FIGS. 1-2, the router 22 sends the print job to a local print provider 24. In other scenarios, the router 22 may send print jobs to a network printer through a network print provider (not shown). When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also. Print jobs to locally connected printers or locally queued to (LPR) to network printers are handled similarly to Windows 95, 98 local print jobs.

In this local printing scenario, the router 22 calls the local print provider 24 with the print job. Local print provider 24 writes or "spools" 8 a raw spool file 26 to disk for later access. This is done to avoid waiting for the printer to complete the job before control is returned to the application. These steps from initiating the print request 1 to writing to spool file 26 may be repeated many times. Data may be appended to spool file 26 until an application signals that the print job is complete. This may be signalled with an EndDoc function. Local print provider 24 also starts 9 a background thread 28 that will determine the best time to start playing back or "despooling" the spool file 26 to the printer 16.

In reference to FIG. 2, Thread 28 monitors spooler subsystem resources to determine a good time to playback spool file 26. When thread 28 determines that playback should commence, a StartDoc function call 10 is sent to print processor 32 to start a new print processor thread 11. Print processor thread 11 invokes the local print provider 24 with a ReadPrinter function call to read part of the spool file 26. A print processor thread 12 also uses the local print provider 24 to invoke the language monitor 34 with a WritePrinter function call to send data through the physical port 38 connected with the bidirectional printer 16 specified previously.

For raw spool files, the default print processor 32 simply passes data through without changing or interpreting any of the information. A language monitor 34 is used in this example because the destination printer 16 is a bidirectional printer. When non-bidirectional printers are used a port monitor 36 would be invoked instead of the language monitor 34. A language monitor 34 and port monotor 36 may be separate components or may be integrated into one monitor.

Language monitor 34 calls 13 a port monitor 36 to send print job data to the printer 16. The port monitor 36 then sends 14 the raw data through the physical port 38 to the printer 16. This process of reading from a spool file 26 and forwarding data to the printer 16 may be repeated several times to complete a print job. This is typically repeated until an end-of-file is reached or the job is cancelled. The playback thread 12 is terminated at that point. The combination of spooler process, router, local print provider, print processor, language monitor and port monitor may be referred to collectively as a "spooler" 30.

When Windows Enhanced Metafile (EMF) format files are used in the printing process of Windows 9.x systems, process components interact differently than with raw files. An example printing process, shown in FIGS. 3 and 4 illustrates the printing process using EMF files.

This process typically commences when an application 40 creates a printer DC and draws an object to the DC (not shown). The application 40 then calls 41 GDI 50 with an EMF spooling request for a designated printer 68. GDI 50 queries 42 the printer driver 52 associated with the designated printer 68 to determine whether the driver 52 supports EMF spooling. If the driver 52 supports EMF spooling, GDI 50 changes the printer DC to an EMF DC and writes 43 the instructions for rendering the object to the EMF DC 54 (creates EMF files). GDI 50 then passes 44 the print request to the 32-bit GDI (GDI32) 56 because, in this example the Windows 95® spooler process is 32-bit code. GDI 32 subsequently makes an interprocess call 45 to the spooler subsystem 70 with a description of the print job.

The spooler process 58 (SPOOL32.EXE), in the spooler system 70, calls the router 60 to pass the print job description to the print provider 62 that can reach the designated printer 68. In this example, a local print provider 62 is used, but a network print provider may also be used. When the default Windows 95® spooler is used, network print jobs are spooled and despooled on the client machine just as local print jobs. The network print server is contacted only during despooling. Windows NT/2000® client machines handle print jobs to network print servers differently, these machines use remote procedure calls (RPCs) to call the necessary printing application program interfaces (APIs) on the print server. In these NT/2000 scenarios, the print jobs do not show up on the local spooler queue, spooling and despooling are handled by the print spooler on the print server. This RPC method can be used in conjunction with Windows 95® spoolers also.

When the router 60 has called the print provider 62, the local print provider 62 creates 48 a job description file 64 and adds 48 a record to the job description file 64 each time it is called for the job until all the EMF page files have been spooled and each EMF file name and location is recorded in the job description file 64. When information about the last EMF file in the print job has been recorded, the local print provider 62 will call the spooler process 58 with an EndDoc function call. This signals the spooler process 58 that the complete job is spooled and ready for despooling. For multipage jobs, these steps from initial spooling request 41 to job description file recording 48 are repeated for each page of a job.

When EMF file spooling is complete, the spooler process 58 sets a ReadyToPrint attribute on the print job and initiates an event 49 that signals to the port thread 66 that a job is available for printing. Port thread 66 responds to this event by determining the best time to start the despooling process and, at that time, loads 81 the print processor 72, as shown in FIG. 4. The print processor 72 will determine that the file format is EMF and call GDI32 56 with a Windows 95® function call 82.

GDI32 then invokes a gdiPlaySpoolStream function to read 83 from the job description file 64 which provides a fully qualified path to an EMF spool file 54. Through the job description file 64 which comprises a list of path names to EMF files, GDI32 knows about all the pages in the print job. The GDI32 gdiPlaySpoolStream function also calls GDI 50, using a thunk built into GDI32, with the path to the EMF spool file to render the page. GDI 50 only knows about one page in the print job at a time.

GDI 50 calls the printer driver 52 associated with the designated printer 68 chosen in application 40 and obtains a DC for the printer 68. GDI 50 then reads page-rendering instructions from the spooled EMF file 54 and passes 85 them one at a time to the printer driver 52 which uses as many instructions as are necessary to render the first part of the page. When the 16-bit printer driver 52 renders a part of the page, it passes 87 the printer-specific raw page data back to the GDI 50 which, in turn, passes 88 the raw data to GDI32 56. GDI32 56 then passes 89 the raw data to the spooler process 58 which then follows the same procedures it would for a raw format files as explained above.

Spooler process 58 calls 90 the router 60 to route the print job to printer 68. In this example, illustrated in FIGS. 3 and 4, the router 60 sends the print job to a local print provider 62. In other scenarios, the router 60 may send print jobs to a network printer through a network print provider (not shown). In this local printing scenario, the router 60 calls the local print provider 62 with the print job. Local print provider 62 invokes the language monitor 74 with a WritePrinter function call to send data through the physical port 78 connected with the bidirectional printer 68 specified previously.

A language monitor 74 is used in this example because the destination printer 68 is a bidirectional printer. When non-bidirectional printers are used a port monitor 76 would be invoked instead of the language monitor 74. A language monitor 74 and port monitor 76 may be separate components or may be integrated into one monitor. Language monitor 74 calls 93 a port monitor 76 to send print job data to the printer 68. The port monitor 76 then sends 94 the raw data through the physical port 78 to the printer 68.

Parts of EMF pages are processed in this manner and printed until an entire page is printed. GDI32 56 then gets the path to the EMF spool file for the next page and calls GDI 50 to use the instructions in that EMF file to render the next page of the print job. The print job is finished when all the paths to EMF spool files are used up.

Other versions of the Microsoft Windows operating systems, such as Windows NT and 2000 may use different printing processes as described with reference to FIG. 5. These processes may be used to print data to local, network and remote printers either directly or through a network print server. EMF data may also be processed differently. For example, in Windows NT and 2000, the entire EMF data for all pages is passed to GdiPlayEMF( ) in one pass, rather than one page at a time. If the EMF data is to be queued on a print server, the EMF data is passed directly to the print server without rendering on the client. A mirror copy of the driver on the server renders the EMF data instead.

Typically, a user will employ an application 100 to create a print job by calling GDI 102 functions. The GDI 102 and/or application 100 will then call Winspool.drv 104 which is a client interface into the spooler. This client interface, Winspool.drv 104, exports the functions that make up the spooler's Win32® API and provides RPC stubs for accessing the server. The print job is then forwarded to the spooler's API server, Spoolsv.exe 106 which can be implemented as a Windows 2000 service that is started when the operating system is started. This API server module exports an RPC interface to the server side of the spooler's Win32® API. This module implements some API functions, but most function calls are passed to a print provider by means of the router, spoolss.dll 108.

The router 108 determines which print provider to call, based on a printer name or handle supplied with each function call, and passes the function call to the correct provider 110, 112 or 114. If the selected printer is managed by the client system, the print job is handled by the local print provider, localspl.dll 110. Printers managed by the local print provider 110 do not have to be physically local to the client, they may also be directly connected to network cards without using a server. When these printers are used, the print job is passed to the kernel-mode port driver stack 116 and on to the printer 118.

When printers located on a Windows NT/Windows 2000 server are selected, the router 108 directs the print job to the network print provider, Win32spl.dll 112. This network provider uses RPC to redirect calls from the client's router to the network server's spoolsv.exe process 124 which forwards the print job to the network server's router 126. Because the network printer is local to the print server system, the network server router 126 routes the job to the server's local print provider 128. The job is then directed to the server's kernel-mode port driver stack 130 and out to the selected network printer 132.

Remote printers may also be used with these systems. When a remote printer is selected, the client router 108 may direct the print job to the local print provider 110 which will forward the job to the kernel-mode port driver stack 116 and on to the remote printer 142 using a network protocol. When the local print provider 110 accesses a remote printer 142, the provider 110 uses a port monitor that can use network protocols recognized by the remote printer or its server.

Printers managed by non-Windows NT/2000 servers (e.g., Novell servers) may also be accessed through this print system. This may be achieved by using a local print provider 110 which directs the print job to the kernel-mode port driver stack 116 and on to the printer's server 136 using a type of network protocol. The server 136 then directs the job to the destination printer 140. This may also be achieved using a customized print provider 114 which sends the job to the kernel-mode port driver stack 116 which uses a network protocol to send the job on the the printer's server 134 which then directs the job to the destination printer 138.

An example of these printing processes may be explained with reference to FIG. 6 which illustrates a Windows 2000 print process. In this process, an application 150 is used to create a print job with the Graphics Device Interface (GDI) 152. When the print job's initial output file is in raw format 154, the printer driver's printer graphics DLL 156 works in conjunction with the GDI 152 to create a print job that is sent to the client interface 160 of the spooler. Client interface 160 sends the job to the API server 162 which forwards the job to the router 164. In this example, the router 164, sends the job to the local print provider 165 as it is a local print job.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in a raw format already, the job is sent to the language monitor DLL 182 and on to the port monitor 184 which sends the job to the kernel-mode port driver stack 186. Port driver stack 186 sends the job to the selected printer 188 for final printing.

When an application 150 creates a print job with GDI 152 in EMF format, the job is sent 154 to a client spooler interface 160. Client interface 160 sends the job to the API server 162 which forwards the job to the router 164. Again, in this example, the router 164, sends the job to the local print provider 165 because the print job is local.

Within the local print provider 165, a print job creation API 168 is invoked. This API 168 accesses the printer driver's printer interface DLL 174 and creates a job spool file 176. The job creation API 168 also forwards job information to the job scheduling API 170 which initiates a job scheduler thread 172.

At this point, the file format is checked 178. If the initial job file is in EMF format, the job is sent to the print processor DLL 180 which directs the job back to GDI 152 for conversion to raw format with the help of printer interface DLL 174. The converted job is then sent back through the spooler client interface 160, API server 162 and router 164 to the print provider 165. In the local print provider, the job is processed by the print job creation API 168, job scheduling API 170 and job scheduler thread 172. Because the job is now in raw format, the job is sent to the language monitor DLL 182 and on to the port monitor DLL 184 and kernel-mode port driver stack 186 before arriving at the destination printer 188.

SUMMARY

Embodiments of the present invention comprise driver-independent, printer-independent systems and methods for sheet assembly.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
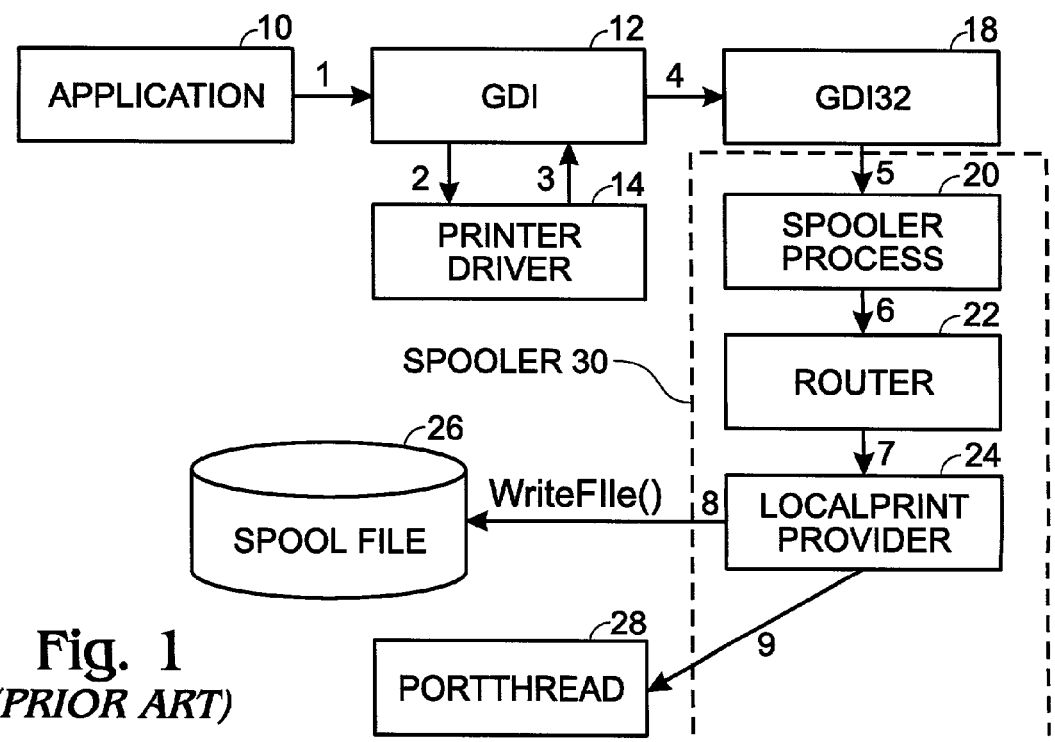
FIG. 1 is a diagram depicting a typical prior art printing process using a raw spool file.
Figure 2:
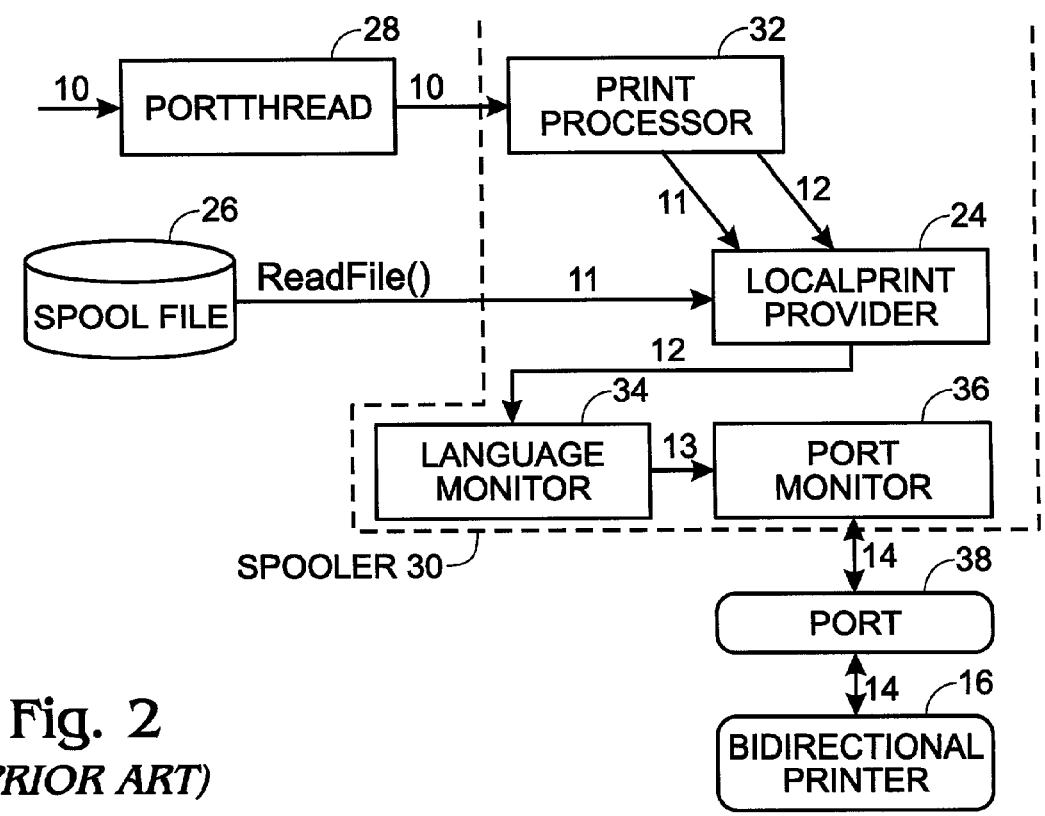
FIG. 2 is a diagram depicting a continuation of the typical prior art printing process using a raw spool file shown in FIG. 1.
Figure 3:
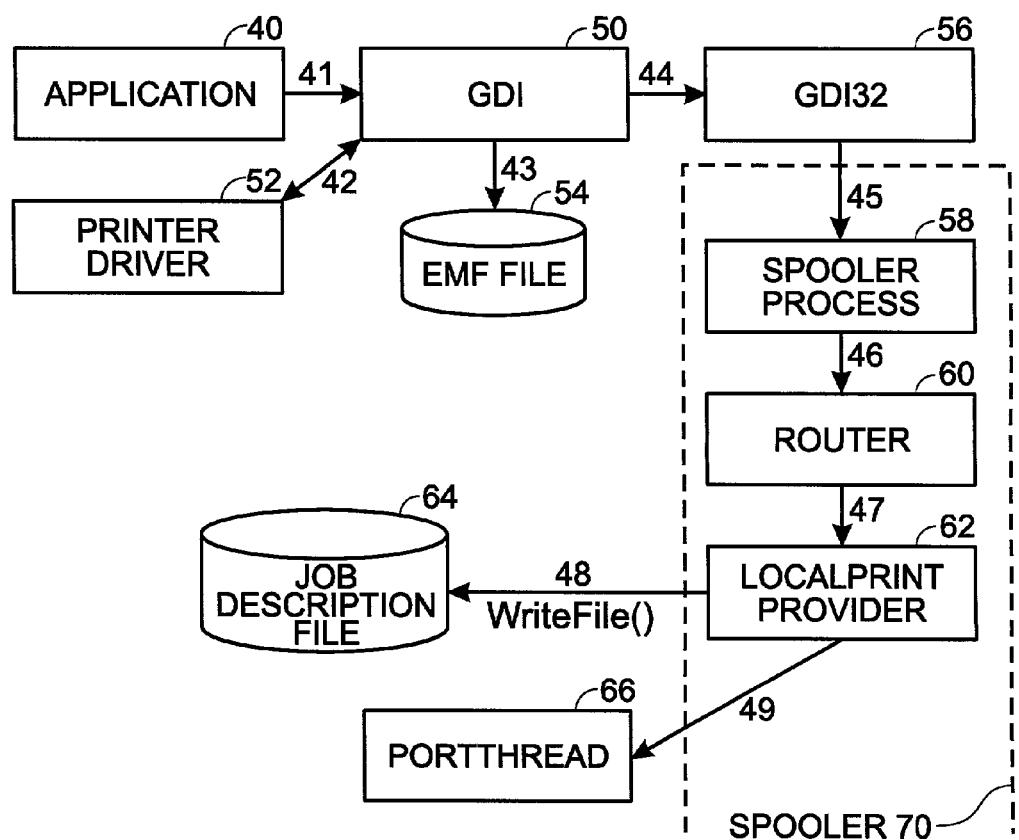
FIG. 3 is a diagram depicting a prior art printing process wherein EMF files are spooled.
Figure 4:
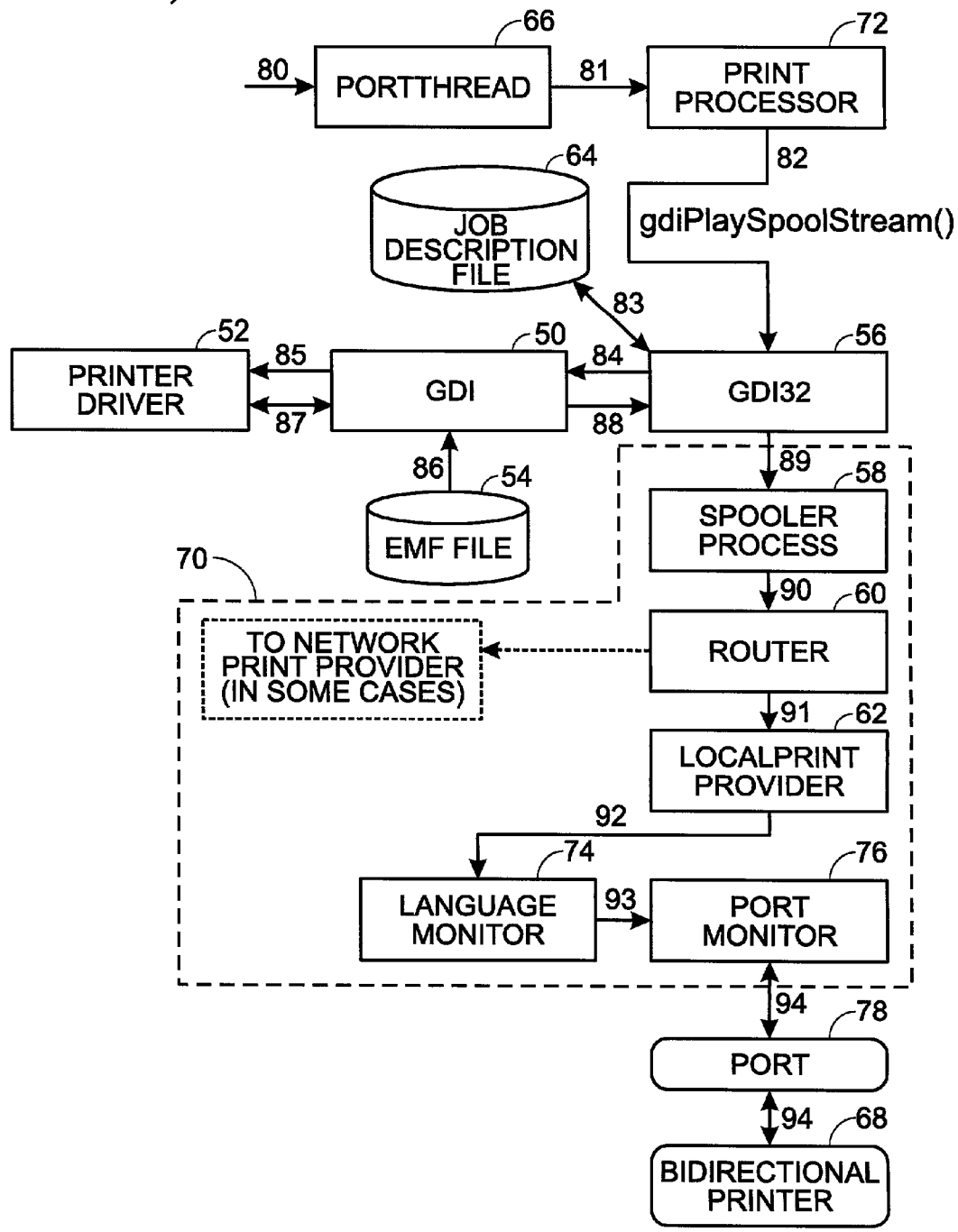
FIG. 4 is a diagram depicting a prior art printing process wherein EMF files are despooled.
Figure 5:
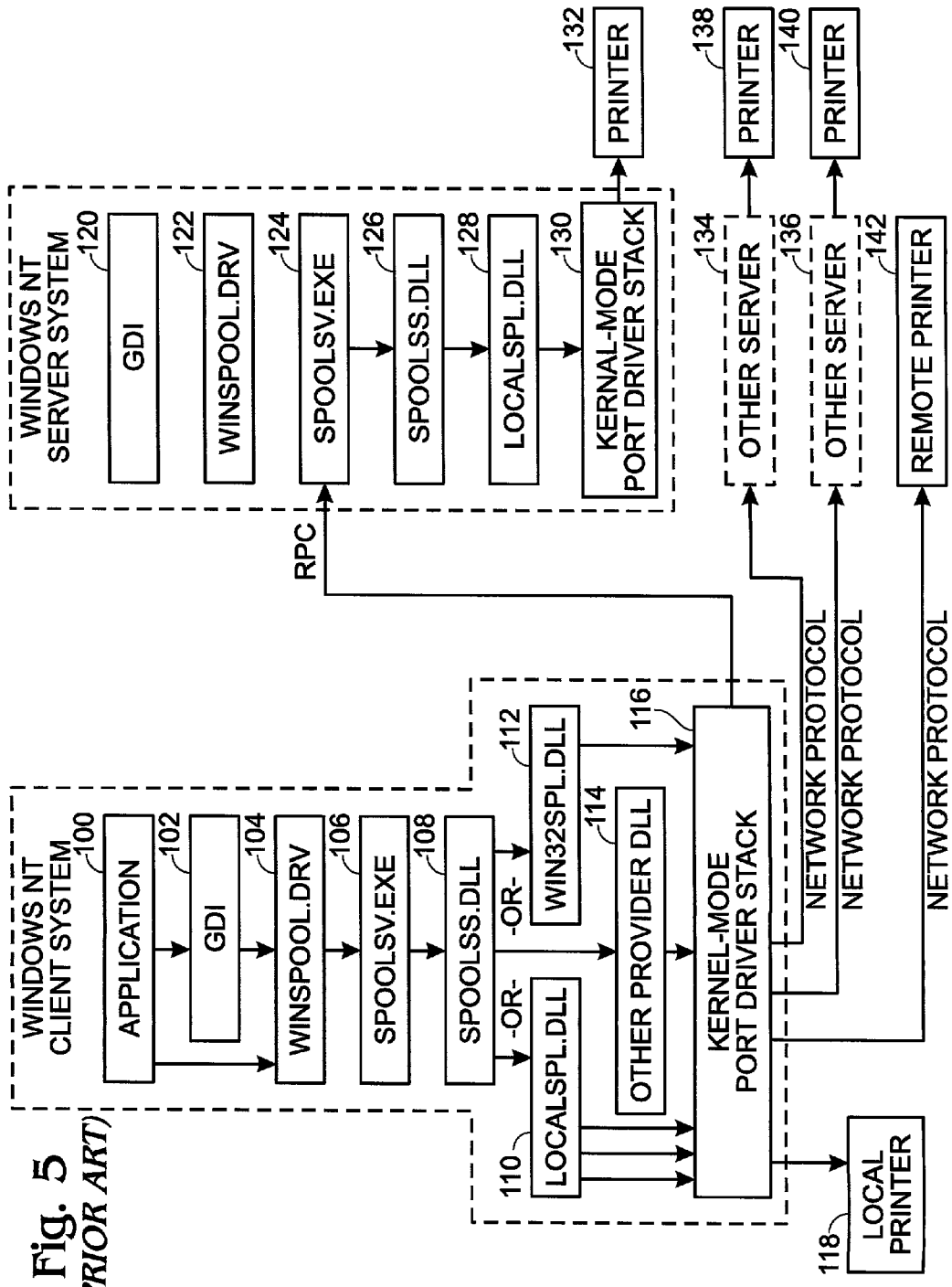
FIG. 5 is a diagram depicting a prior art printing process used in a Microsoft Windows NT/2000 operating system.
Figure 6:
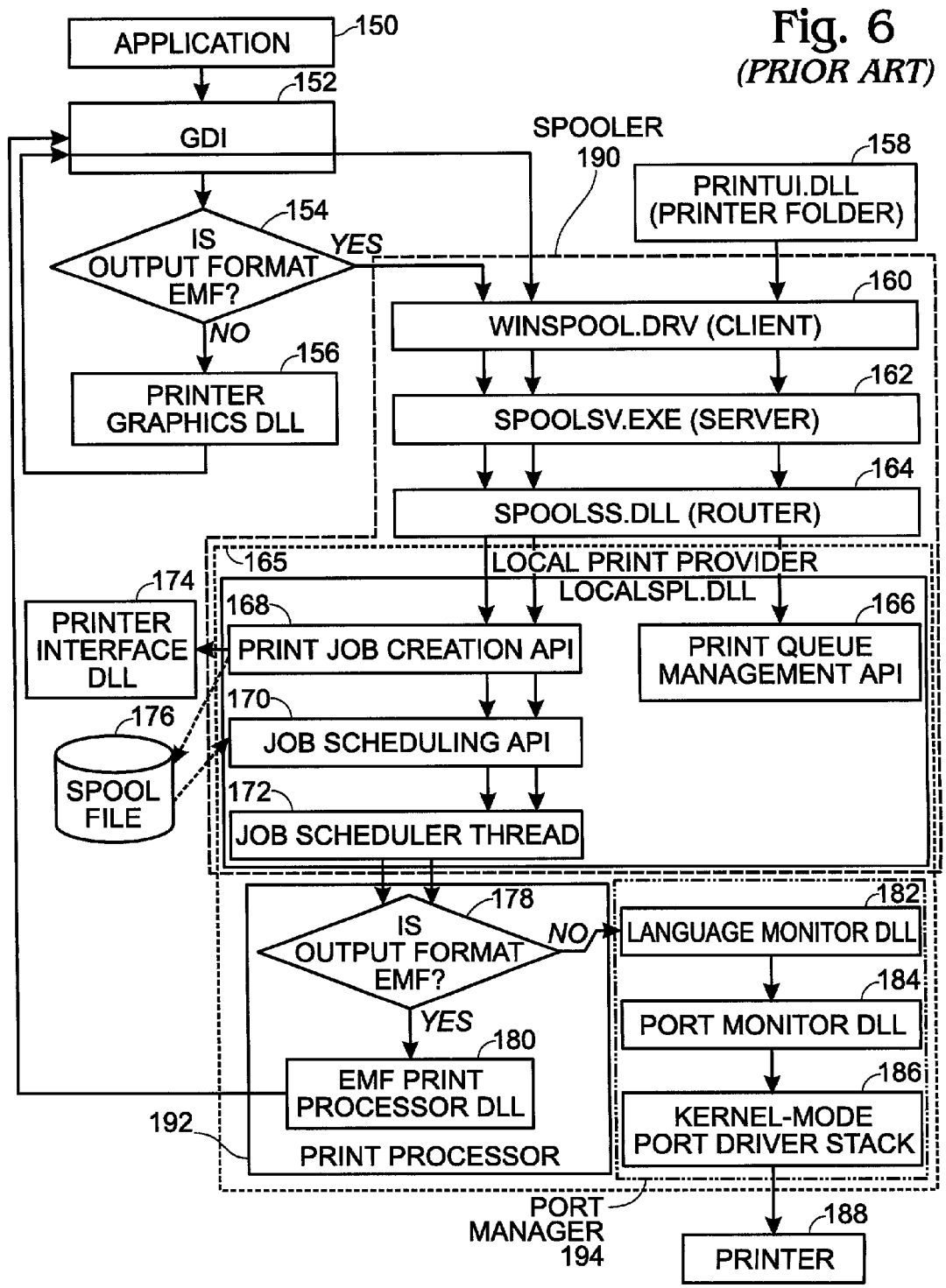
FIG. 6 is a diagram depicting the prior art printing process used in a Microsoft Windows NT/2000 operating system shown in FIG. 5.

To simplify discussion of a printing system some groups of system components may be referred to collectively. A group of components comprising a spooler client interface 160, spooler API server 162, router 164, print job creation API 168 and job scheduling API may be referred to as a spooler 190 in a Windows NT/2000 operating system. A group of components comprising a language monitor 182, port monitor 184 and port driver stack 186 may be referred to as a port manager 194. A group of components comprising a file format director 178 and EMF print processor DLL 180 may be referred to as a print processor 192.

The systems and methods of embodiments of the present invention typically operate within a system comprising one or more printers connected together in a common network environment (locally connected, remotely connected through network print queue or combinations thereof), a computing device capable of spooling a print job, and a printer driver and print processor compatible with the printing devices, such as in the Microsoft Windows 9x, NT, 2000 and XP operating systems.

Generally, a user initiates a print job that may consist of one or more documents, each consisting of one or more pages, and collectively consisting of one or more copies. A print job may be pre-processed into printer-ready data, such as when an application renders its output in a Page Description Language (PDL), such as Hewlett Packard's Printer Command Language (PCL), Adobe's Postscript, Adobe's Portable Document Format (PDF), a Tagged Image File Format (TIFF) or rasterized (as typically done for inkjet printers), as non-limiting examples. A print job may also be journaled, where the rendering instructions are recorded, and the playback of the rendering instructions is deferred, such as when Microsoft's Enhanced Meta File (EMF) format or Sharp's Printer Meta File (PMF) format, for example.

In many operating systems including variations of Microsoft Windows and others, a user typically selects a command, a sequence of commands, and/or some stimulus to signal to the computing device that the user intends to spool a print job. The computing device responds to the user by presenting the user with a dialog (e.g., a Printer UI, command line query, front panel display) in which the user may select options relating to the spooling of the print job. One of these options is the selection of the printing device(s) (e.g., printer, plotter, MFP, CD burner, etc.) to which to despool the print job. Once the printing device(s) is/are selected, the computing device responds by loading the printer driver and print processor associated with the printing device(s) and the printer driver responds, automatically or by user initiation, to the user by presenting the user with a dialog in which the user can select options relating to the printing device's capabilities. For example, and not by way of limitation, a user may select print quality, paper size, orientation, tray selection, manual feed, stapling, watermarks and other options.

In other embodiments, the print job may be initated by another process and the selection of print options may be obtained by other means such as default settings, job tickets and other methods.

In some of these systems, the dialog presented to the user for selecting options specific to the printing device's capabilities includes a dialog on sheet assembly. Within this dialog, a user can select print order (i.e., normal order, reverse order and/or booklet), scale/placement (Duplex, Nup, Print-Club and/or Booklet), and Collation (groups or sets).

Once the user has completed selecting options specific to both the print job and the printing device(s), the computing device initiates the spooling of the print job. The steps in this process may comprise: 1) the printer driver constructing print job specific information (e.g. DEVMODE in Microsoft Operating Systems); 2) compilation of rendering instructions; and either 3) rendering (i.e., preprocessing into printer ready data); or 4) recording for deferred playback (i.e., journaling). A print job may already be rendered, partly or wholly, into printer ready data. In this case, the step of compiling rendering instructions may then be skipped partly or entirely.

The output from the print driver (i.e., spooled print job) additionally contains information regarding sheet assembly options selected for the print job. These options may include order, scale/placement, collation and others. The output is generally referred to as a spool file and the contents are generally referred to as spool data. This data may be stored on disk, in memory, in cache, or any other form of storage compatible with the computing device.

Once the spool file has been created, the computing device passes, immediately or delayed, control of the spool file to the associated print processor for the selected printing device(s). This system may be referred to as the spooler. The print processor reads the spool file and determines if the content is pre-processed printer-ready data (e.g., RAW mode in the Microsoft Operating Systems), or journaled (e.g., EMF mode in the Microsoft Operating System).

At this point, in known systems and methods, the Spooler passes chunks of spool data to the Print Processor, until all of the spool data has been read. The Print Processor makes no interpretation of the spool data contents, but processes the data in one of two paths, depending on whether the data is recorded for deferred playback (i.e., journaled), or printer-ready data (i.e., rendered).

If the spool file was recorded for deferred playback (i.e., journaled, such as EMF, etc.), each chunk of spool data is played back to the printer driver and Graphics Device Interface (GDI) associated with the targeted printer (in a Microsoft operating system). In some situations, the playback may not consume all of the chunk of spool data and may push some of the data back to be played again. For example, the GDI in a Microsoft operating system may play one EMF file at a time, and push back any remaining data in the chunk of spool data. In these known systems, the sheet assembly must be done either by the printer driver as it renders the data or deferred to the printer firmware by prepending sheet assembly instructions to the printer-ready data that are understood by the printer firmware. An example of this known process is shown in FIG. 7.

Some basic sheet assembly, such as booklet, Nup and reverse order printing may be "hardwired" into versions of the Windows 2000 print processor in EMF mode only.

Figure 8:
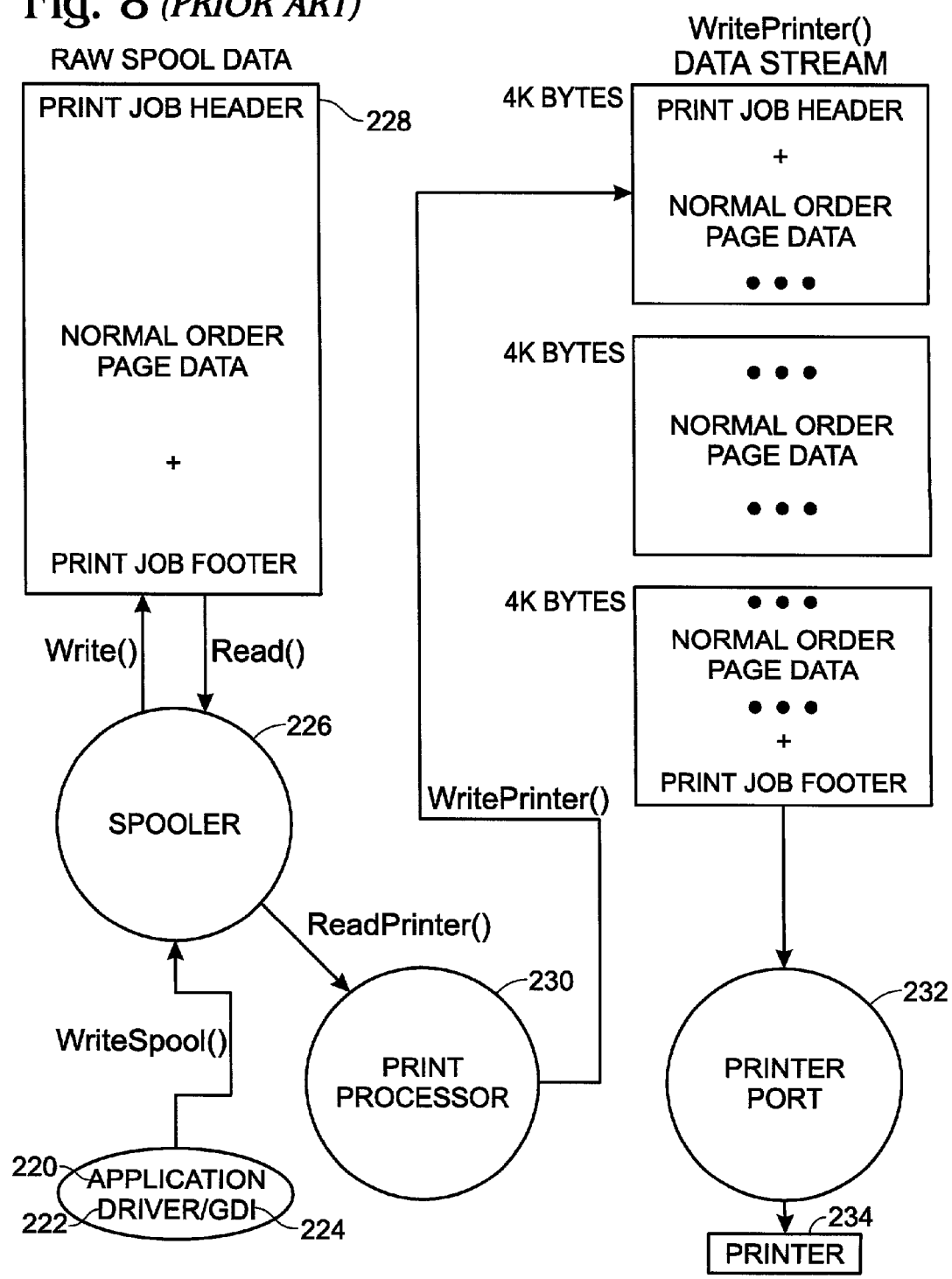
FIG. 8 is a diagram depicting an embodiment of the present invention used in conjunction with a raw mode printing process.

If the spool file contains printer ready data, each chunk of spool data is written directly to the printer port associated with the targeted printer. All of the chunk of spool data is consumed by the write to the printer port. The sheet assembly, if not already performed by the printer driver, must be deferred to the printer firmware, where the printer-ready data has prepended sheet assembly instructions that are understood by the printer firmware. An example of this known process is shown in FIG. 8.

Figure 7:
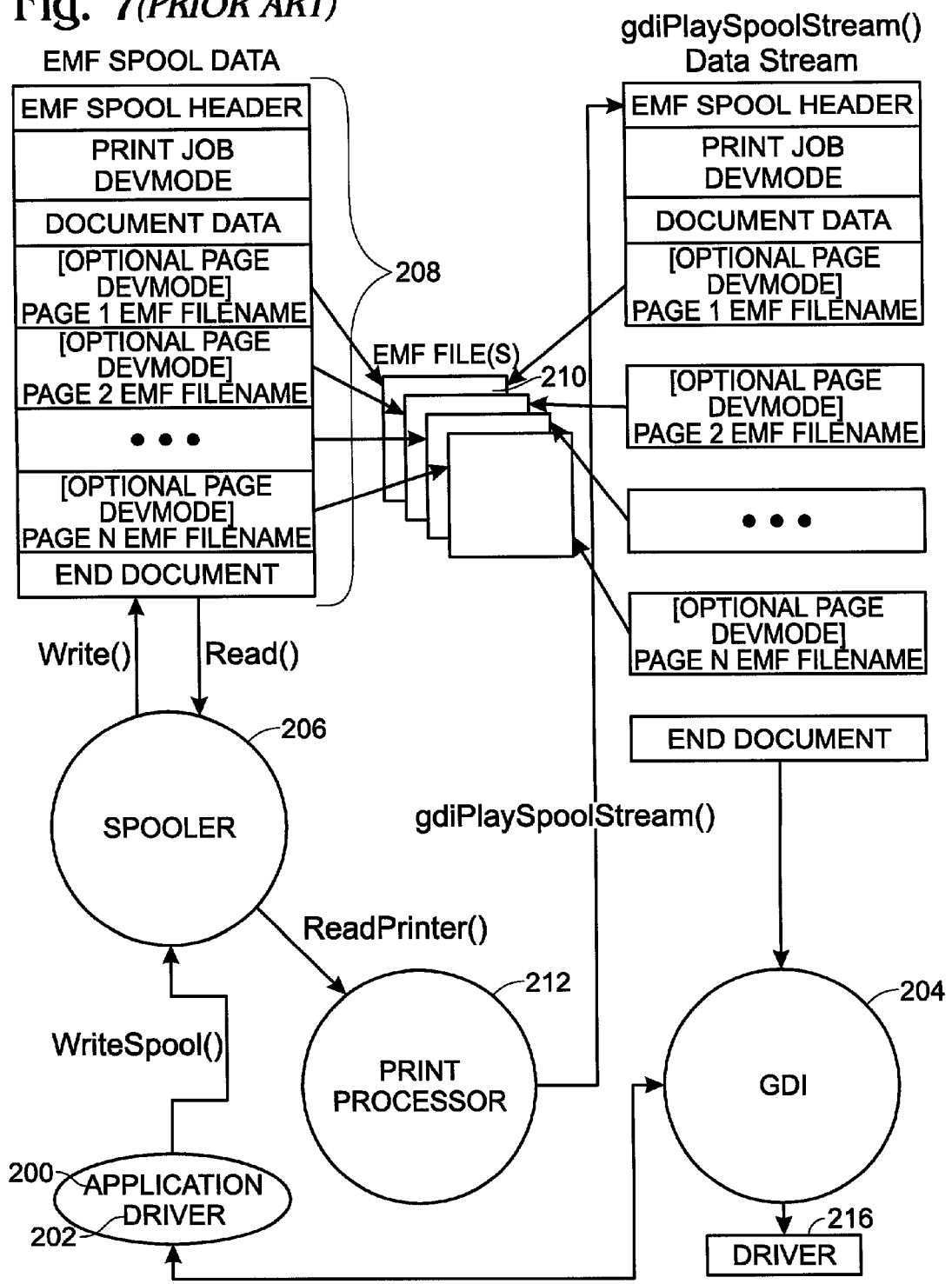
FIG. 7 is a diagram depicting an embodiment of the present invention used in conjunction with an EMF mode printing process.

In some printing systems such as those used in Microsoft Windows 9x, Me, NT, 2000, XP and other systems, print data may be stored in one or more spool files as shown in FIG. 7. These spool files may use a Windows Enhanced Metafile (EMF) format to quickly record a print job and allow an application to continue running while the print job is completed. In other operating systems similar journaled files may be used.

In reference to FIG. 7, an application 200 works in conjunction with a print driver 202 and a GDI 204 to create a print job as explained above. This print job is sent to a spooler 206 such as spoolers 30, 70, 190 or others. Spooler 206 creates one or more spooler data files 208 comprising print data, Devmode data and one or more EMF filenames. Devmode data is device initialization and environment data. Typically, in a Windows 9x or Me system, multiple EMF files will be used to record a multi-page print job. Spooler data file 208 may take the form of a job description file 64, may be part of spool file 176 or may be represented in another manner depending on the particular operating system and print job type. A GDI 50 or spooler 190 will also create one or more EMF files 210 to store print data. In Windows NT/2000, a single EMF file is created with the EMF data for each page embedded within in sequential order.

After these files are created, control is passed to the print processor 212. When the system determines that actual printing should commence, the print processor 212 plays the print data stored in spool data file 208 and EMF files 210. This data is played to the GDI 204, for example GDI 50 or 152 where it is converted with the help of a driver 216 to a printer-ready format that is forwarded to a printer.

When a file is printed in a rendered (RAW mode in Microsoft systems) mode format, as shown in FIG. 8, an application 220 working with the system GDI 224 and printer driver 222 creates a print job and sends that job on to the spooler 226. Spooler 226 creates a spool file 228 comprising raw spool data. This data may be stored, for example, in Printer Job Language (PJL), Printer Control Language (PCL) or Portable Document Format (PDF). At actual printing time, the print processor 230 plays the spool file 228 to the printer port 232 where it is directed to a printer 234. Because the data is already in a rendered format in the spool file, it does not need to be processed again by the GDI 224 or driver 222.

Figure 9:
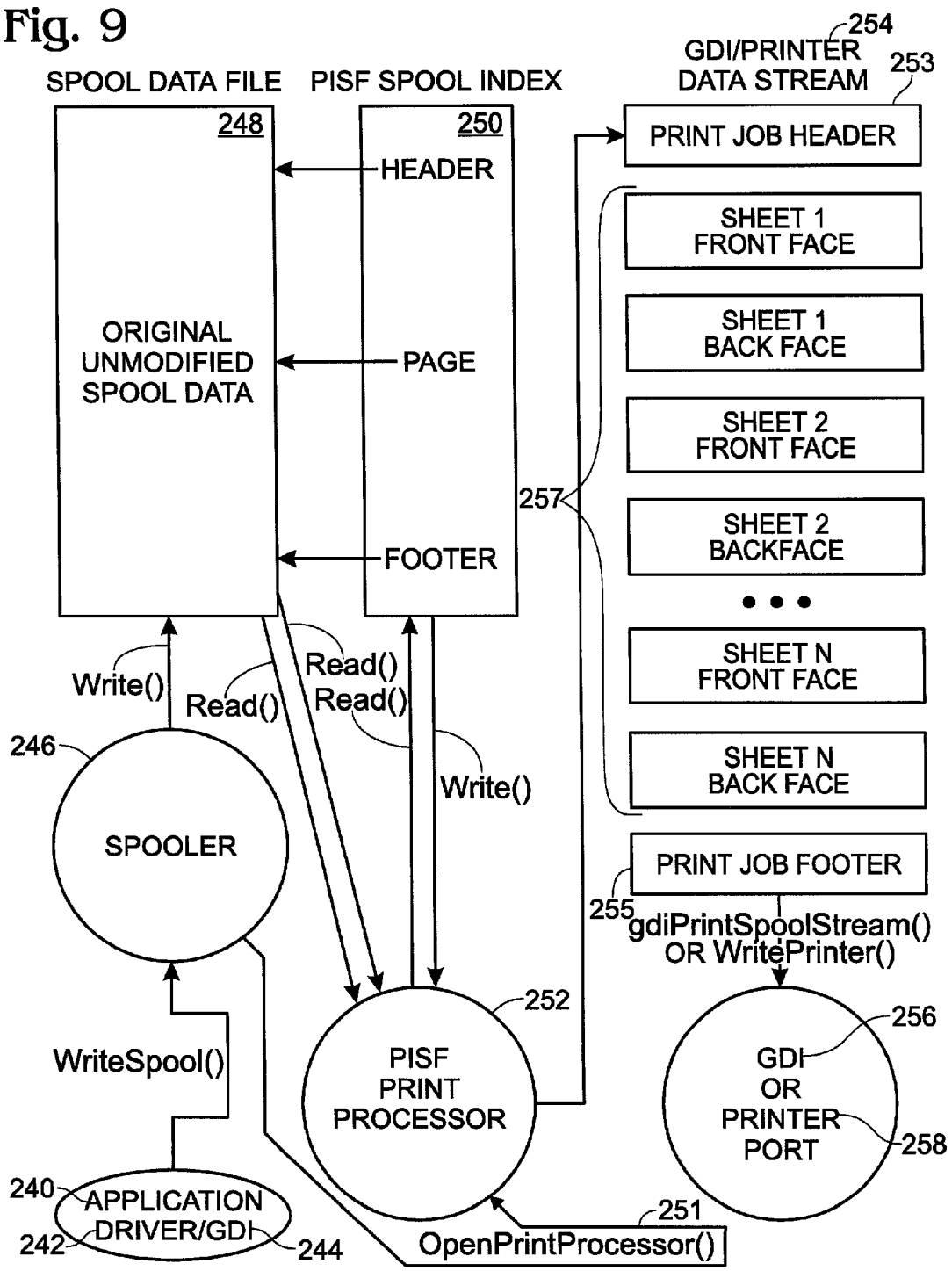
FIG. 9 is a diagram depicting a PISF spool index file of an embodiment of the present invention.

The systems and methods of embodiments of the present invention provide print-processor-based, driver-independent sheet assembly features for printers without firmware support of these features. These features can be enabled through the use of a page-independent spool format (PISF) file or spool index file as shown in FIG. 9.

Embodiments of the present invention improve on existing methods, described above, by parsing the spool file to generate a Page-Independent Spool File Index (i.e., PISF Spool Index), and replacing the existing Read Spool Data interface from the Spooler (e.g., ReadPrinter( ) on the Microsoft family of operating systems) with a PISF specific Read Spool Data interface from the Print Processor.

In the example of the Microsoft family of operating systems, this can occur when the Spooler 246 initiates the despooling process by calling the OpenPrintProcessor( ) function 251 of the Print Processor 252, but before the first spool data is read by the Print Processor 252 (i.e., PrintDocumentOnPrintProcessor( )). After the call to OpenPrintProcessor( ) 251, the file pathname to the Spool Data File is known by the Print Processor 252. Whether the spool data is journaled (i.e., EMF) or printer ready data (i.e., RAW) is also known. If the spool data is printer ready data, the PDL type can be determined by examination of the first block of data, typically containing a PJL header ending in ENTER PRINTER LANGUAGE=<PDL>. Even without a PJL header, language specific constructs (e.g., PCL, PDF, Postscript) can be quickly spotted.

Once the PDL type (or EMF) is determined, a PDL (or EMF) specific parser may be invoked to parse the Spool Data File 248 and generate a PISF Spool Index 250. The PISF Spool Index 250, which may be represented as a disk file or in-memory data structure, contains information to partition the Spool Data File 248 into regions of spool data that correspond to the Print Job Header 253, Print Job Footer 255 and the front and back of sheets 257 to be printed.

After the PISF Spool Index 250 is generated, a PDL (and EMF) independent Spool Read function, which replaces the existing ReadPrinter( ) Spool Interface, is invoked from the Print Processor 252. Unlike the existing ReadPrinter( ) function which has no knowledge of the contents of the Spool Data File 248, the new Read Data function will use the PISF Spool Index 250 to return single spool data chunks corresponding to the sequential order: Print Job Header, the front and then back of each sheet, and the Print Job Footer.

These embodiments typically comprise one or more applications 240 which generate printable documents. The printing process is typically initiated with the application calling the GDI 244 and driver 222 to create a print job which is sent to the spooler 246. As explained above, the spooler 246 may comprise many components and may operate differently according to the print job file format and the operating system. Generally, the spooler 246 creates a spool data file 248 which records the print job or portions thereof in a static format. These embodiments further create a PISF spool index file 250 which comprises print job data in a page independent format. Once the PISF spool index file 250 has been created, a custom print processor 252 may manipulate and modify the PISF file 250 to achieve different sheet assembly and formatting options. In some embodiments, print processor 252 may comprise a user interface to prompt for user preferences. A user interface may also reside elsewhere such as, but not limited to, spooler 246, driver 242 or other components. A user interface may also act as a stand-alone component which allows print system components to access its data. In other embodiments, a user interface is not required.

When the print system determines that the print job should be forwarded to the printer port 258, print processor 252 plays the print job to the correct destination. For EMF files, the files are played to the GDI 256 and any other components necessary for rendering the job and getting it ready for transmission to the destination printer. For raw data files, the files may be played to the port monitor where they are directed to the printer port 258 and on to the destination printer. However, in these embodiments, print processor 252 reads PISF file 250 rather than spool data file 248. PISF spool index file 250 may be used to control the organization or format of the print job. For example, and not by way of limitation, PISF spool index file 250 may be used to convert a conventional print job to booklet format, N-up format, reverse order format or otherwise change the scale, placement, order or collation sequence of the print job. In this manner, PISF spool index file 250 allows a user to change print job formatting characteristics from the print processor 252. These methods may be used to add print job formatting functionality and features to systems which did not previously have those features. While prior art systems needed specialized printer-specific drivers or specialized hardware, embodiments of the present invention can achieve the same functionality simply by replacing the print processor. Because the print processor is not a printer-specific component, a single print processor may be used to upgrade a wide array of printers to the improved functionality provided by embodiments of the present invention. In some embodiments, spooler components may also be used to achieve this functionality.

Figure 10:
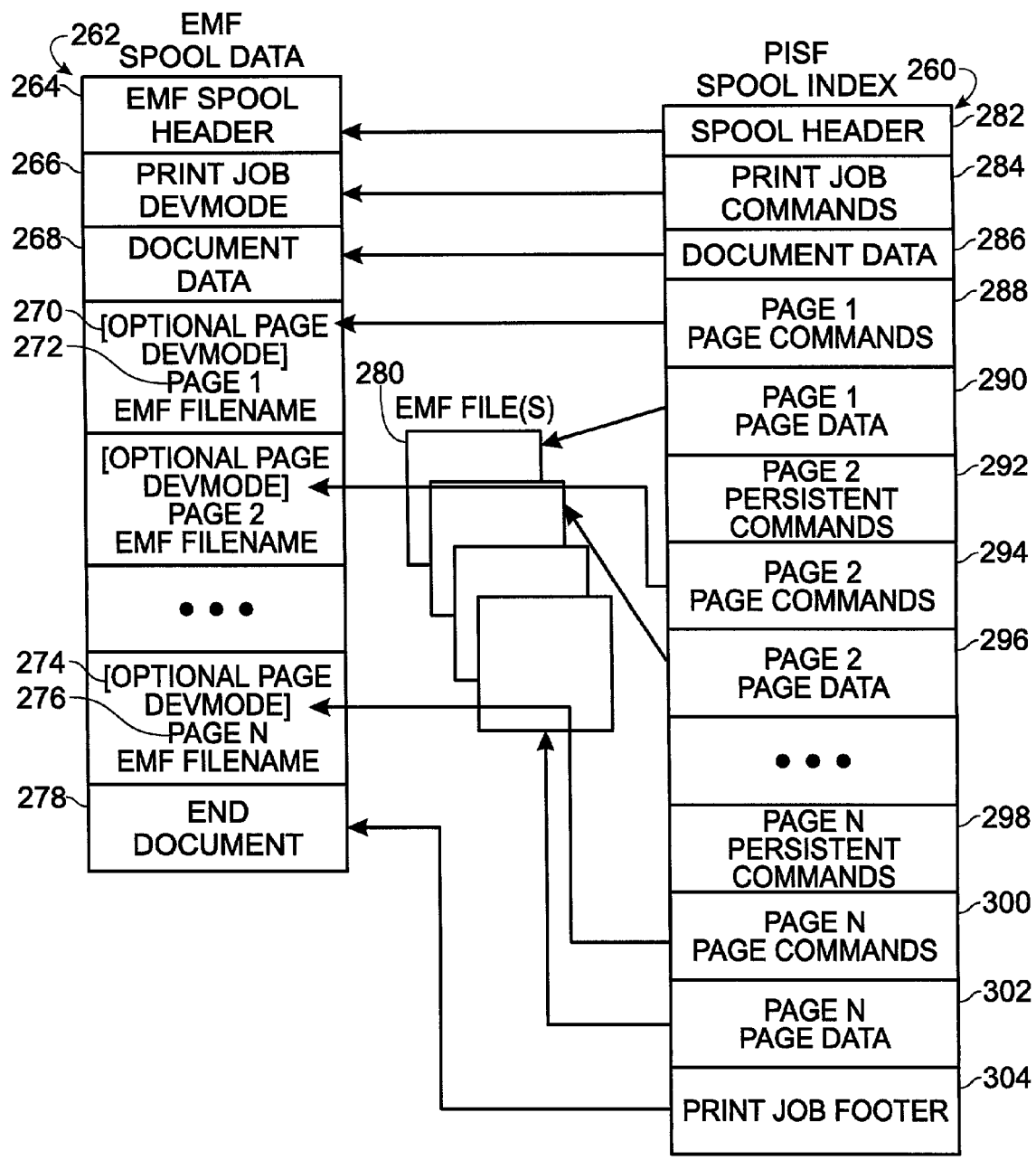
FIG. 10 is a diagram depicting the relationship of an EMF spool data file to a PISF spool index file of an embodiment of the present invention.

Details of specific embodiments of PISF spool index files 260 may be explained with reference to FIG. 10 wherein a PISF file 260 created from an EMF spool data file 262 is depicted.

If the Spool Data is journaled, as in the case of EMF or PMF, the contents of the Spool Data File 262 already corresponds closely to the PISF Spool Index 260. In the example of EMF, the Spool Data File 262 consists of a Spool File Header 264 for identification, a Print Job DEVMODE 266 (i.e, Print Job Header), Document Data 268 which is descriptive information on the print job, but not part of the print data, and a sequence of optional Page DEVMODE 270, 274(i.e., Page Commands) and EMF page file names 272, 276 (i.e., Page Data), one per page, and ending with an End Document Footer 278 (i.e., Print Job Footer). The Page Data is stored outside of the Spool Data File 262 in individual EMF Files 280, one per page in some systems. Other systems, such as Windows NT/2000 may use a single EMF file for multiple page documents.

In Windows NT/2000, EMF page data is embedded where the EMF pathname would have been in the Windows 9x format. Each EMF page data is preceded by a marker that has an offset link to the next page. Therefore, pages can be traversed without parsing the entire file.

The PISF Spool Index 260 comprises an ordered collection of records, each containing information for locating and extracting spool data corresponding to the respective record type. A PISF Spool Index 260 does not contain any spool data. The PISF Spool Index 260 may comprise the following records: 1) Spool Header 282, 2) Print Job Commands 284, 3) Document Data 286, 4) One or more sequences of a) Page Persistent Commands 292, 298, b) Page Commands 288, 294 & 300 and c) Page Data 290, 296 & 302, and 5) Print Job Footer 304.

For EMF files, the Spool Header 282, Print Job Commands 284, Document Data 286 and Print Job Footer 304 may have a one-to-one mapping with the EMF Spool Header 264, Print Job DEVMODE 266, Document Data 268, and End Document 278 respectively.

For each page, page commands 288, 294 & 300 are the preamble to each page which setup the printing of the page and may include commands for page orientation, dot resolution, paper sizes, etc. These page commands 288, 294 & 300 may be optional in some embodiments. Page Data 290, 296 & 302 is the actual data to print on the page such as text, vector and graphics. Persistent commands 292 & 298 may be any page commands that persist across page boundaries (i.e., do not get reset). When printed in normal order, the persistent data commands 292 & 298 are 'inherited' along with the current page commands for the current page being printed.

For EMF files, the Page Commands 288, 294 & 300 and Page Data 290, 296 & 302 may have a one-to-one mapping with the optional Page DEVMODE(s) 270 & 274 and EMF File(s) 280 respectively. If an optional Page DEVMODE 270 & 274 is present, all page commands 288, 294 & 300 inherited from the Print Job DEVMODE 266 are merged and the new merged Page DEVMODE 270 & 274 overrides the Print Job DEVMODE 266 for all subsequent pages (i.e., persists) in normal order until another Page DEVMODE 270 & 274 is encountered. To preserve this relationship, the Page 1 Persistent Command record points back to the Print Job Commands 284 (i.e., Print Job DEVMODE 266), and the remaining Page Persistent Command records 292 & 298 point back, if any, to the Page Command record 288, 294 & 300 of the last previous page that had an optional Page DEVMODE 270 & 274.

EMF spool data file 262 may be a job description file 64 or similar file. EMF spool data file 262 may comprise an EMF spool header 264 and print job devmode data 266 which comprises device initialization and environment data. EMF spool data file 262 will typically also comprise document data 268 and the filename or filenames 272, 276 of EMF files 280 containing data to be printed in the print job. An EMF spool data file 262 may also comprise optional page devmode data 270, 274. An EMF spool data file 262 is generally terminated with an end document statement 278.

In embodiments of the present invention which create PISF spool index files 260 in relation to print jobs in EMF mode, information in the EMF spool data file 262 is indexed in the PISF file 260. PISF spool index file 260 comprises a spool header 282 which comprises information from the EMF spool header 264. PISF index file 260 may also comprise print job commands 284 which comprise links and information related to the print job devmode data 266. A PISF file 260 may also comprise document data 286 related to the document data 268 in the EMF spool data file 262. A PISF file 260 may also comprise page commands 288, 294 and 300 that may comprise page formatting and orientation data for each page of a print job. These page commands 288, 294 and 300 are related to the optional page devmode data 270, 274 contained in the EMF spool data file 262. A PISF file 260 may also comprise page data 290, 296 and 302 which links to the EMF files 280 for each page in the print job. In multi-page print jobs, pages subsequent to the first page, such as page 2 and page N in this example, need to be converted to a page-independent format so that each page may be manipulated as an independent unit. This may be achieved by placing persistent commands 292, 298 in the PISF file 260. Persistent commands 292, 298 comprise page formatting, orientation and other data that is stored as document data 268 or other data that is stored in a document-wide format in the EMF spool data file 262. A print job footer 304 is used to conclude a PISF spool index file 260.

Figure 11:
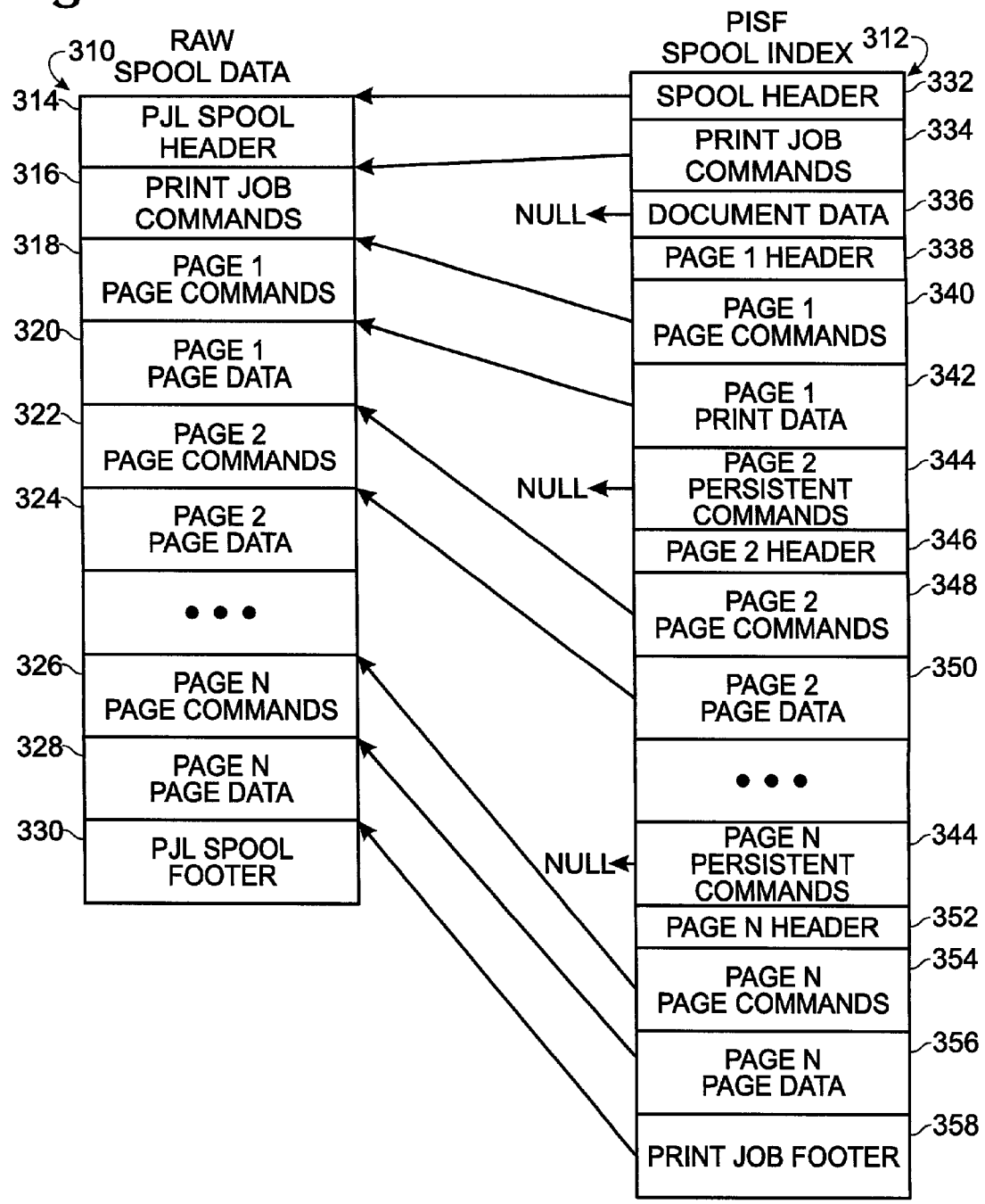
FIG. 11 is a diagram depicting the relationship of a raw spool data file to a PISF spool index file of an embodiment of the present invention when a page-independent printer language is used.

Some embodiments of the present invention may be used in conjunction with raw mode print jobs which use page-independent printer languages such as PCL XL, Postscript and PDF as shown in FIG. 11. When this is the case, the contents of the Spool Data File 310 already corresponds closely to the PISF Spool Index 312, with the exception that there is no persistent data 344 in page independent formats. Generally, there is no document data 336 as well, unless embedded in PDL-specific, non-printing comments. In these situations, a raw spool data file 310 is generated by the print system. Raw spool data file 310 comprises a header file such as Printer Job Language (PJL) spool header 314 which may identify file characteristics and location. Raw spool data file 310 also comprises print job commands 316, page commands 318, 322 & 326 and page data 320, 324 & 328. Page commands 318, 322 & 326 comprise page formatting and orientation data. Page data 320, 324 & 328 comprises a description of the image to be printed on each page. A raw spool data file 310 may be concluded with a print job spool footer such as PJL spool footer 330.

A PISF spool index file 312 created from a raw spool data file 310 comprises a spool header 332 which relates information in the raw file header such as PJL spool header 314. A PISF spool index file 312 may also comprise print job commands 334 which comprise links to print job commands 316.

Because raw spool data file 310 is already in a page-independent format, document data 336 may not contain document-wide formatting and other information. Formatting data may be contained in page headers 338, 346 & 352 and page commands 340, 348 & 354 in a page-independent format. Data for a specific page is contained in page headers 338, 346 & 352, page commands 340, 348 & 354 and page data 342, 350 & 356. These file segments may contain actual print job data or, in some embodiments, may comprise modifiable links to the raw spool data file 310. Due to the page-independent format of the raw spool data 310, persistent commands 344 may not exist as their information is already stored in a page-independent format. A PISF spool index file 312 of these embodiments may be terminated with a print job footer 358.

For page-independent PDLs, each pair of Page Commands 318, 322 & 326 and Page Data 320, 324 & 328 are independent of all other pages. In other words, if combined separately with the Print Job Commands 316, each page would print identically, as if all pages combined together with the Print Job Commands 316. Since no page commands persist across the page boundaries, the Page Persistent Data records 344 are NULL.

If the Spool Data is printer ready data and in a page-dependent format, such as PCL 5, the contents of the Spool Data File 360 already corresponds closely to the PISF Spool Index 362. Generally, there is no document data 386 as well, unless embedded in PDL-specific non-printing comments. For page-dependent PDLs, each pair of Page Commands 368, 372 & 376 and Page Data 370, 374 & 378 are not independent of all other pages. The Page Commands 368, 372 & 376, such as loading font set, persist to the subsequent pages until overridden by another Page Command 368, 372 & 376. Unlike EMF, where the optional Page DEVMODEs replace the persistent data as a whole, the persistent data is accumulative. The Persistent Data records 392 & 398 point back to the previous page's Page Command records 388 & 394, whose page's Persistent Data record points back to its previous page's Page Command record. In this case, the persistent data on any one page, is the recursive traversal and accumulation of the Page Command records in sequential normal order of pages 1 . . . n-1, where n is the current page.

Figure 12:
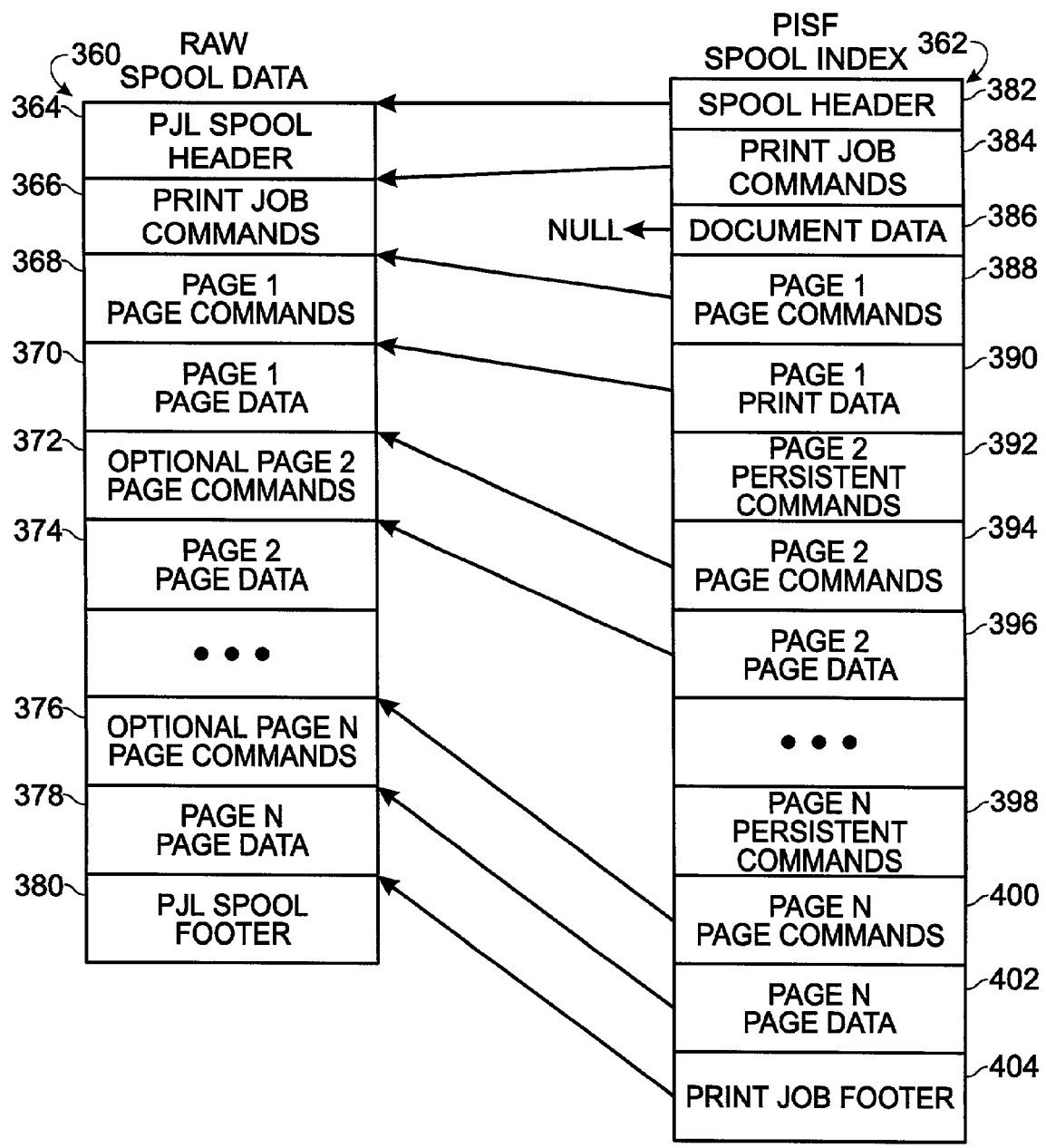
FIG. 12 is a diagram depicting the relationship of a raw spool data file to a PISF spool index file of an embodiment of the present invention when a non-page-independent printer language is used.

Other embodiments of a PISF spool index file 362 may be described with reference to FIG. 12. These embodiments relate to raw spool data files 360 which are in a page-dependent format such as files which use the printer command language PCL 5. These raw spool data files comprise print job information in a spool header such as a PJL spool header 364 which identifies file characteristics. Further print job formatting and orientation data may be contained in print job commands 366. This document-wide date is typically followed by page commands 368 for page one and any subsequent pages that have commands that differ from those established for previous pages. Page commands for page two 372 and other pages such as page N 376 are optional and will not generally be present unless the formatting of those pages differs from that of page one. Following page commands 368 and 372 & 376 (when present) will be the page data 370, 374 & 378 for those pages. Page data 370, 374 & 378 comprises the actual text and graphic elements to be printed on the media. A page-dependent raw spool data file 360 may be terminated with a print job spool footer 380, such as in PJL.

A PISF spool index file 362 that is related to a page-dependent raw spool data file 360 typically comprises a spool header 382, print job commands 384, page commands 388, 394 & 400, page data 390, 396 & 402, persistent commands 392 & 398 and a print job footer 404. Spool header 382 may comprise file identification information. As PISF spool index file 362 is an index file it comprises links to the information stored in the raw spool data file 360. Print job commands 384 comprise links to or information related to formatting and orientation data for the print job as a whole. Document data 386 may be null as document data in non-page-specific formats is converted to a page-independent format and dispersed in the spool index file 362 such as in persistent commands 392

& 398. Page commands 388, 394 & 400 comprise page-specific formatting and orientation data. Page data 390, 396 & 402 comprise the text and graphics to be printed on the media. Persistent commands 392 & 398 comprise links to data necessary to make each page independent from the others. A PISF spool index file 362 may be terminated with a print job footer 404.

Figure 13:
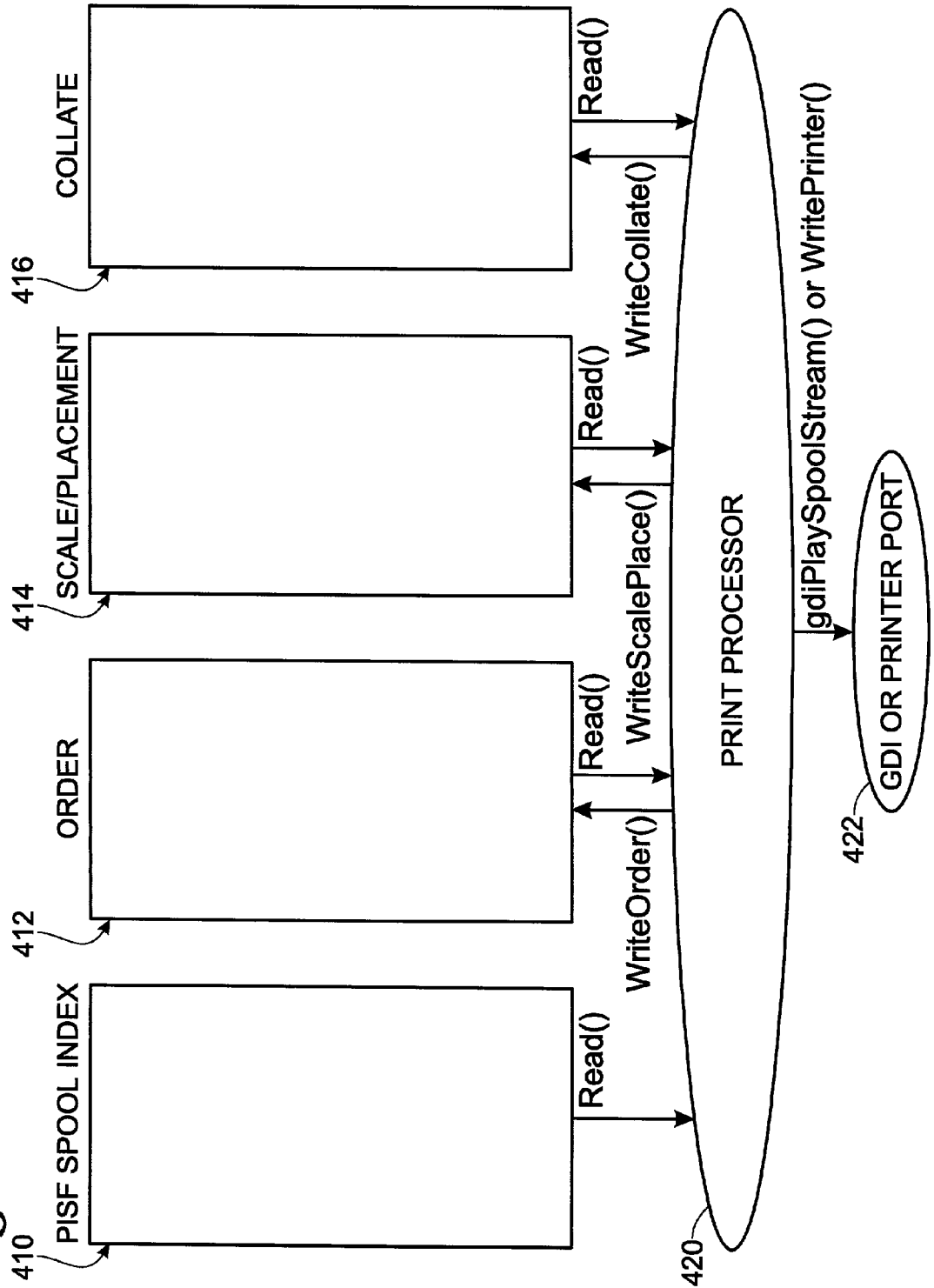
FIG. 13 is a diagram depicting various processes of sheet assembly in some embodiments of the present invention.

Once the PISF Spool Index is generated, sheet assembly can be performed by manipulating the PISF Spool Index file 260, 312 & 362, without any additional disk space and disk I/O. In contrast, manipulation of the spool data can require significant resources which are not always available. PISF spool index file manipulation may be further explained in reference to FIG. 13.

This may be accomplished by replacing the Spool Read function, ReadPrinter( ), which reads sequential blocks directly from the Spool Data 262, 310 & 360, by a new Read Spool function which performs a virtual read I/O instead of a direct I/O. The virtual read I/O goes through the PISF Spool Index file 260, 312, 362 & 410 requesting conceptual constructs, such as the Print Job Commands, data for a specific page, and Print Job Footer. The virtual read I/O uses the PISF Spool Index to locate and assemble the spool data, which may not be physically contiguous. The spool data is then returnes back to the print processor 420 in a form that appears to be a single contiguous block of spool data. The Read Spool function in the Print Processor 420 does not need to have any knowledge of the PDL (or EMF) type or the Spool Data layout on disk.

In some embodiments, sheet assembly may be accomplished by manipulating the PISF Spool Index file 260, 312, 362 & 410 through several passes: 1) Page Order; 2) Page Scale and Placement; and 3) Sheet Collation. This Ordered Index File Processing (OIFP) provides for simple and efficient processing and manipulation of index files. Each pass transforms the current PISF Spool Index file 410 into a new PISF Spool Index file 412, 414 & 416, from which the new Read Spool function would return data in an order already assembled for the selected sheet assembly options.

In these embodiments incorporating OIFP, the first pass 412 processes the page order for sheet assembly options that effect sheet order such as reverse order, booklet, and duplex formats. The second pass 414 processes the page scale and placement for sheet assembly options, such as booklet, Nup, and PrintClub. The third pass 416 processes the sheet collation for sheet assembly options such as Collate, Sets and Groups.

Each pass is independent of the other passes and does not require any knowledge of the prior pass. However, in these embodiments, the passes must be in the specified order: 1) Order; 2) Scale/Placement; 3) Collate as required for OIFP. In alternative embodiments, the order of the passes may be changed, but some passes may require knowledge from previous passes.

Once the PISF spool index file 410 has been processed for order 412, scale and placement 414 and collation 416 to achieve the desired document formatting, the modified spool index file 416 may be read by a print processor 420 and played to the appropriate GDI, printer port or other element for printing.

Figure 14:
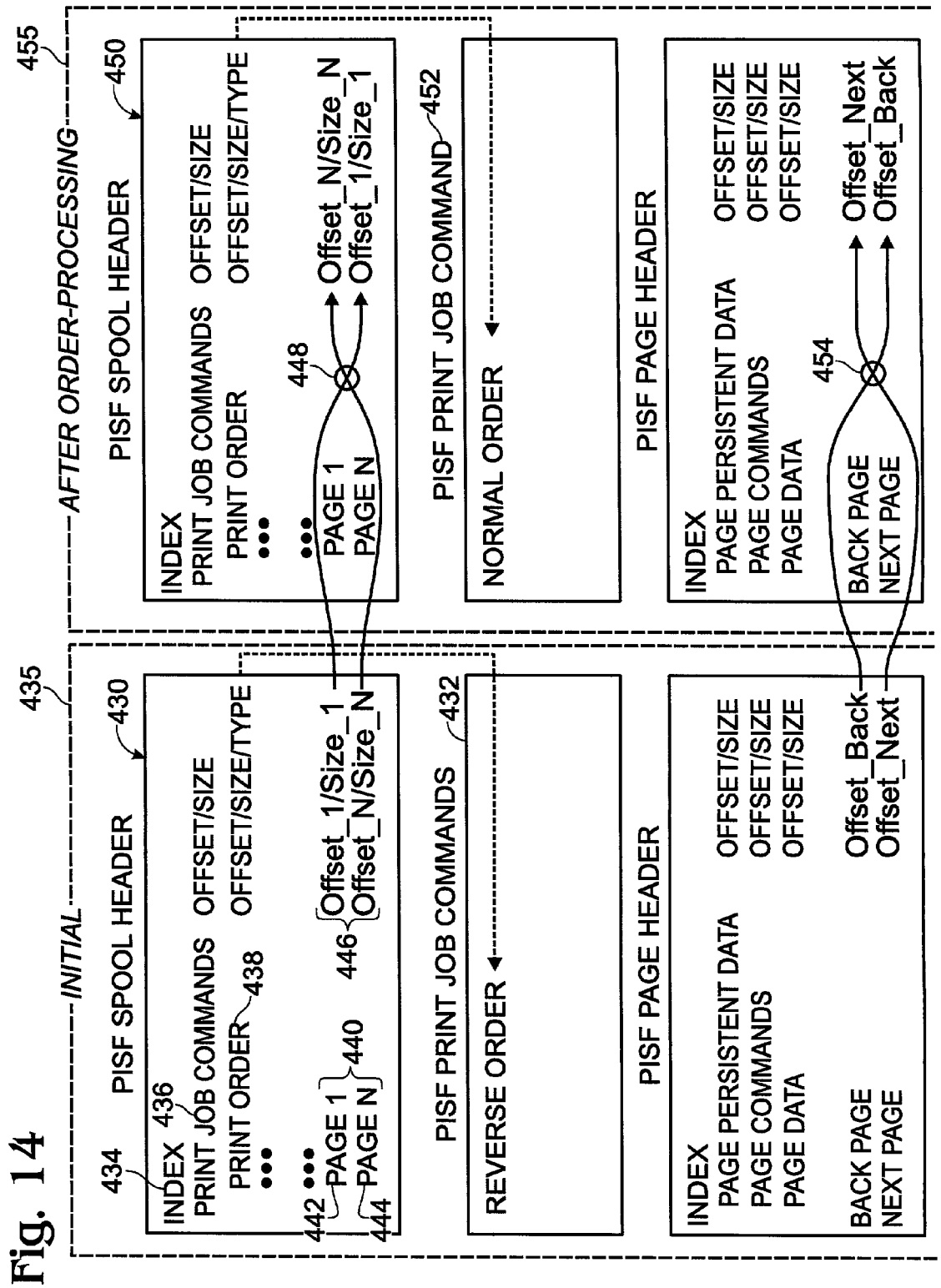
FIG. 14 is a diagram depicting a reverse order sheet assembly process of some embodiments of the present invention.

The order-processing pass of embodiments of the present invention may be explained with reference to FIG. 14. During the order-processing pass, which is the first pass in an OIFP process, the initial PISF Spool Index file 435 is manipulated first for Reverse Order, if this sheet assembly option was selected. To accomplish this, the PISF Spool Index file 435 must be manipulated to change the sequential order of pages and change the Print Job Command for Reverse Order 432 to Normal Order 452.

A PISF Spool Header contains an index 434 to locate records within the PISF Spool Index file 435. The index contains information for locating the Print Job Command record 436, the location, size and data type of the Print Order command index 438 within the Print Job Command record 432, and information for the Page record 440 for the $1^{st}$ page 442 and last page 444 in normal sequential order. Each Page record 440 contains an index 446 to locate the Page record for the first page and the last page in sequential normal order.

This information is used to change the Print Job Command for Reverse Order 432 to Normal Order 452 in the PDL (or EMF) specific language format. This is performed to avoid duplication of the reverse order process in the system. The index is also modified 448 so that the $1^{st}$ page is the last page and the last page is the $1^{st}$ page. Each Page record is then traversed to change 454 the index so that the Back Page record is the Next Page record, and the Next Page record is the Back Page record. In this manner, the print order of the actual document pages is reversed in the print processor without specialized drivers or hardware and commands to perform the reverse order outside the print processor are reset to retain the existing order thereby avoiding duplication of reordering processes.

Figure 15:
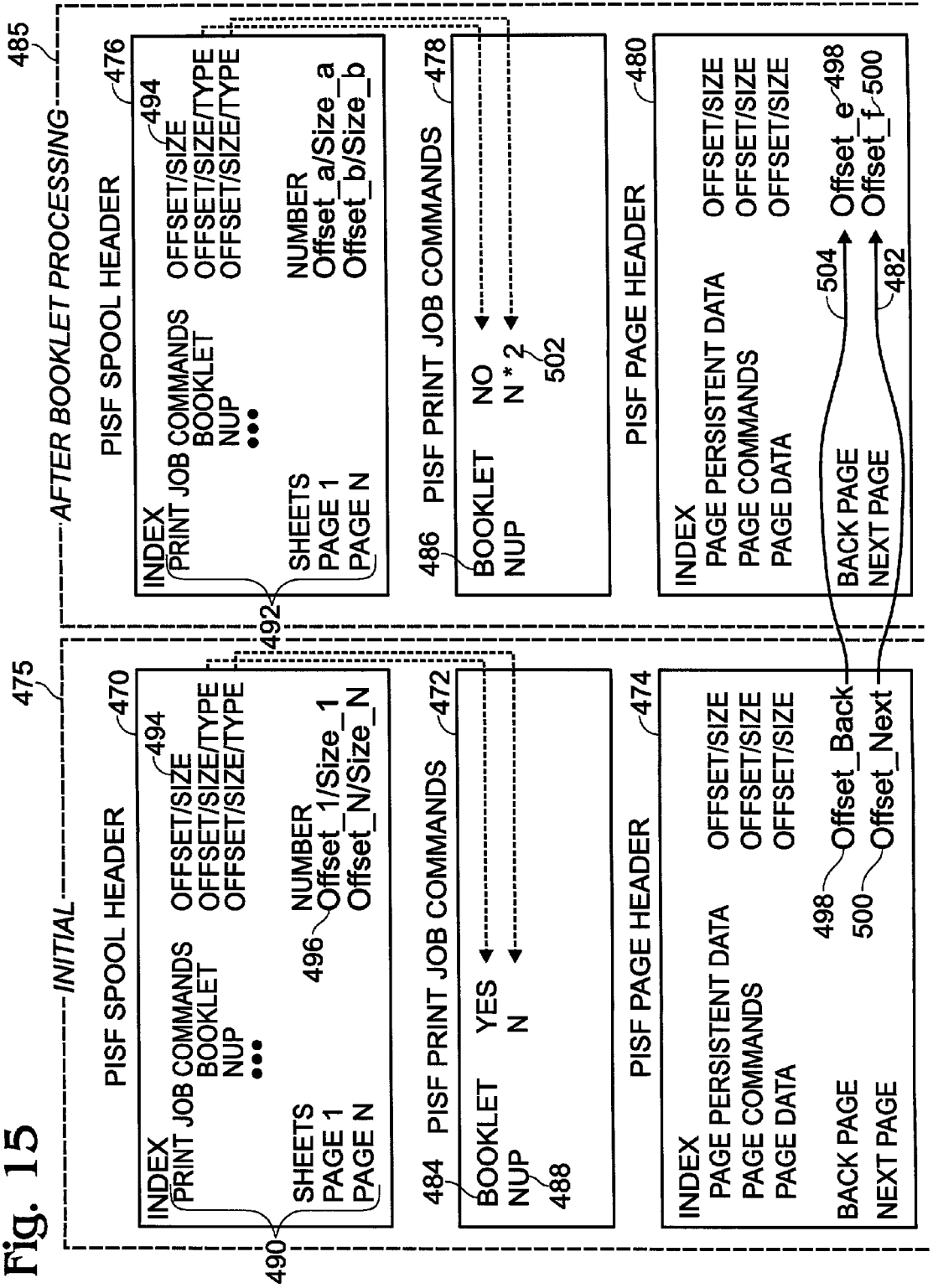
FIG. 15 is a diagram depicting a booklet sheet assembly process of some embodiments of the present invention.

Booklet format printing may also be achieved in embodiments of the present invention as shown in FIG. 15. In booklet printing format, two document pages are printed on each side of a media page in landscape orientation in an order that allows the media pages to be assembled into a bound booklet with each page folded in half. When following the order of an OIFP process, once the PISF Spool Index file is manipulated for Reverse Order, if any, the PISF Spool Index is manipulated for Booklet printing if the booklet assembly option was specified. To accomplish this, the PISF Spool Index file 475 must be manipulated to change the sequential order of pages 482 & 504 and change the Print Job Command for Booklet 484 to Non-Booklet 486 and update the Print Job Command for Nup 488 to allow booklet printing 502. Note, in alternative embodiments, booklet printing processing can be performed prior to Reverse Order processing, but it would change the ordering algorithm used in OIFP processes.

The PISF Spool Header 470 & 476 contains an index 490 & 492 to locate records within the PISF Spool Index file 475 & 485. The index 490 & 492 comprises information for locating the Print Job Command record 494, the location, size and data type of the Print Order command index within the Print Job Command record 472 & 478. Index 490 & 492 may also comprise information for the Page record for the $1^{st}$ page in sequential normal order 496, after being transformed for Reverse Order, if performed, and the total number of pages and sheets. Each Page record contains an index to locate the Page record for the previous (back) page 498 and the next page 500.

This information is used to change the Print Job Command for Booklet 484 to Non-Booklet 486 in the PDL (or EMF) specific language format, to change the Print Job Command for Nup 488 to 2 times the current value 502 (defers scaling and placement to the next pass in OIFP embodiments), and to traverse Page records and change the index for the Back 498 and Next 500 Page to be reordered 482 & 504 in Booklet order (see Booklet algorithm below). As booklet format places two pages per sheet face, the Nup value is doubled. Note, that the number of sheets (media pages), not pages (document pages), is used to calculate the Booklet Order. If pages were used, an Nup value greater than 1 would have to be remembered between the two phases of Order and Scale/Placement.

Booklet order for Normal Order printing and Reverse Order Printing are not identical. Different algorithms are used depending on the printing order. This phase of the pass may store data regarding whether the PISF Spool Index was transformed for Reverse Order to apply the proper Booklet order algorithm.

Figure 16:
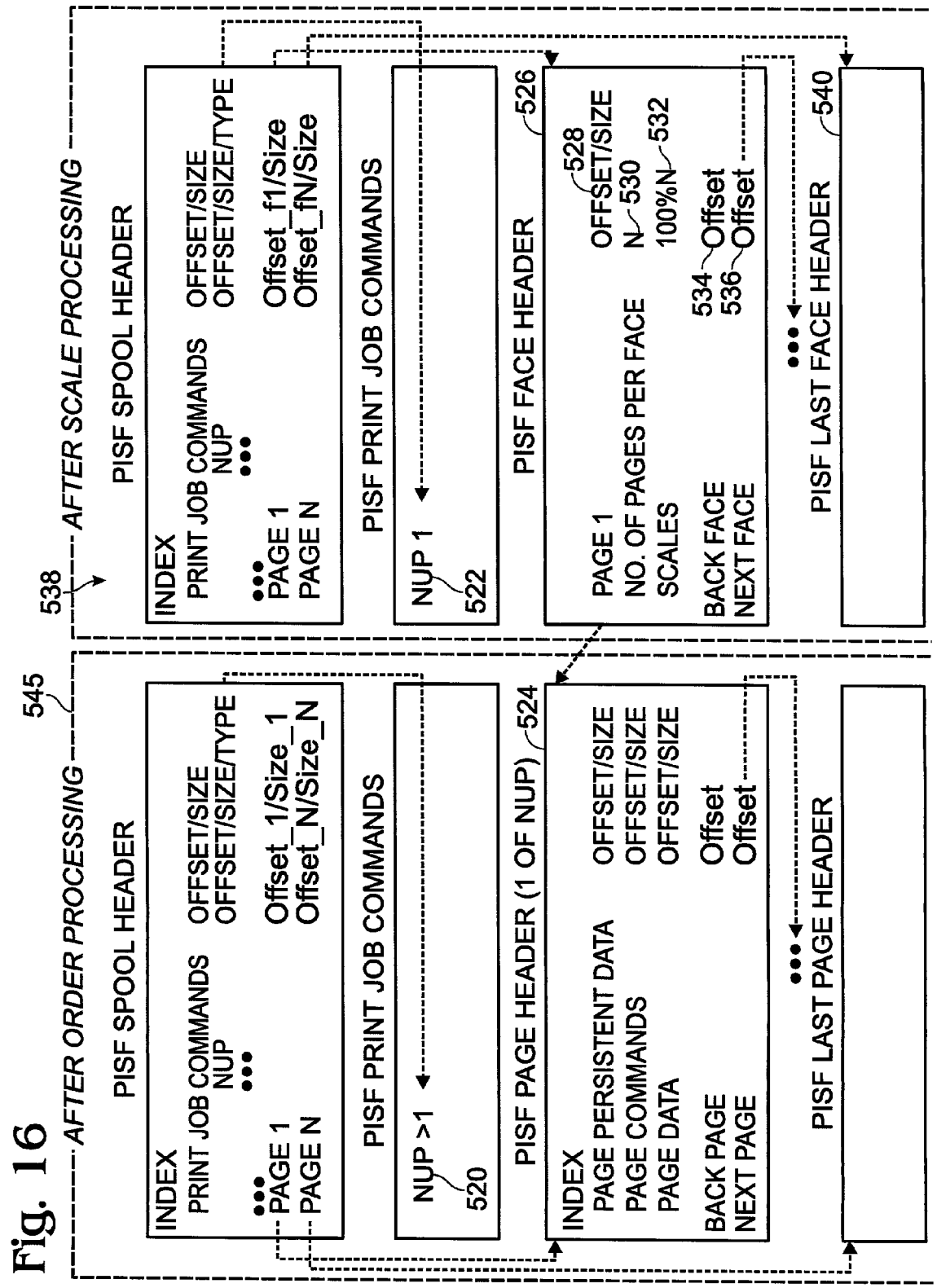
FIG. 16 is a diagram depicting a Nup sheet assembly process of some embodiments of the present invention.

Once a PISF Spool Index is manipulated for Sheet Order in OIFP embodiments, the PISF Spool Index is manipulated for sheet assembly options that change page scale and placement, such as Booklet and Nup, if these options are selected. To accomplish this, two passes may be made during this phase, one for scale and one for placement. This phase of these embodiments may be explained with reference to FIG. 16.

During the scale pass, the value of the Print Job Command for Nup 520 is changed to the value 1 522, and the Page records 524 are grouped into Nup number of pages, in sequential order. Each grouping is represented by a temporary introduction of a new PISF record, a PISF Face record 526. This record 526 contains an index for describing the layout of a single side of a sheet of paper, referred to as a Face. The index contains information for locating the Page Record of the $1^{st}$ page in the group 528, the number of pages in the group 530, the page scale 532 (typically, 100% represents page size=sheet face size), and location of the previous (back) 534 and next 536 Face records.

During the placement pass 538, the PISF Spool Index file 545 is manipulated where each Face record 526 & 540 is traversed, and the Face records 528-536 are used to merge the Nup groups of Page Data and/or Page records into a new single Page Data and/or Page record, one per Face record 526 & 540.

Each Face record 526 & 540 is used to locate the respective Page records and page order. A PDL (or EMF) specific process may be used to merge the Page records into a single new Page record. In the merging process, new PDL (or EMF) specific Page commands 530, 532 are inserted to change the page scale and location (i.e., origin) of the page on the sheet face. In some embodiments, the old Page records become the temporary Face records. Alternative embodiments may preserve the Page records and use the Face record during the Read Spool Data interface to identify spool data to mask out (e.g., conflicting page commands) and insert new page commands (i.e., scale and placement). In these embodiments, no additional disk space is used, and the spool data file may be left intact.

Figure 17:
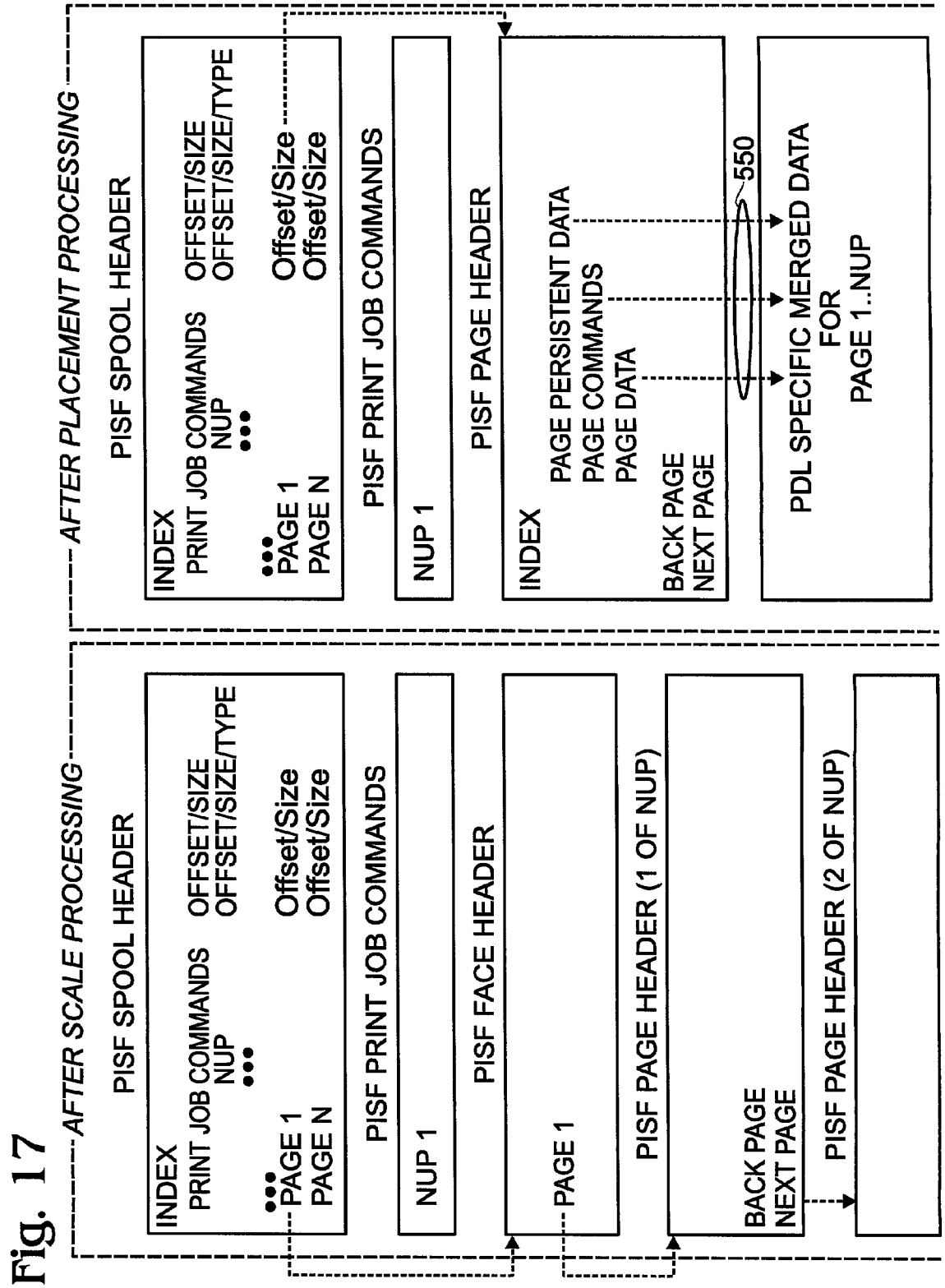
FIG. 17 is a diagram depicting further portions of the Nup sheet assembly process depicted in FIG. 16.

Alternative embodiments, as shown in FIG. 17, may use a PDL (or EMF) specific merge process 550 to merge the Page Data from the Spool Data File, instead of merging Page records. In these embodiments, additional disk space may be used for the second, modified, copy of the Page Data from the Spool Data File.

Figure 18:
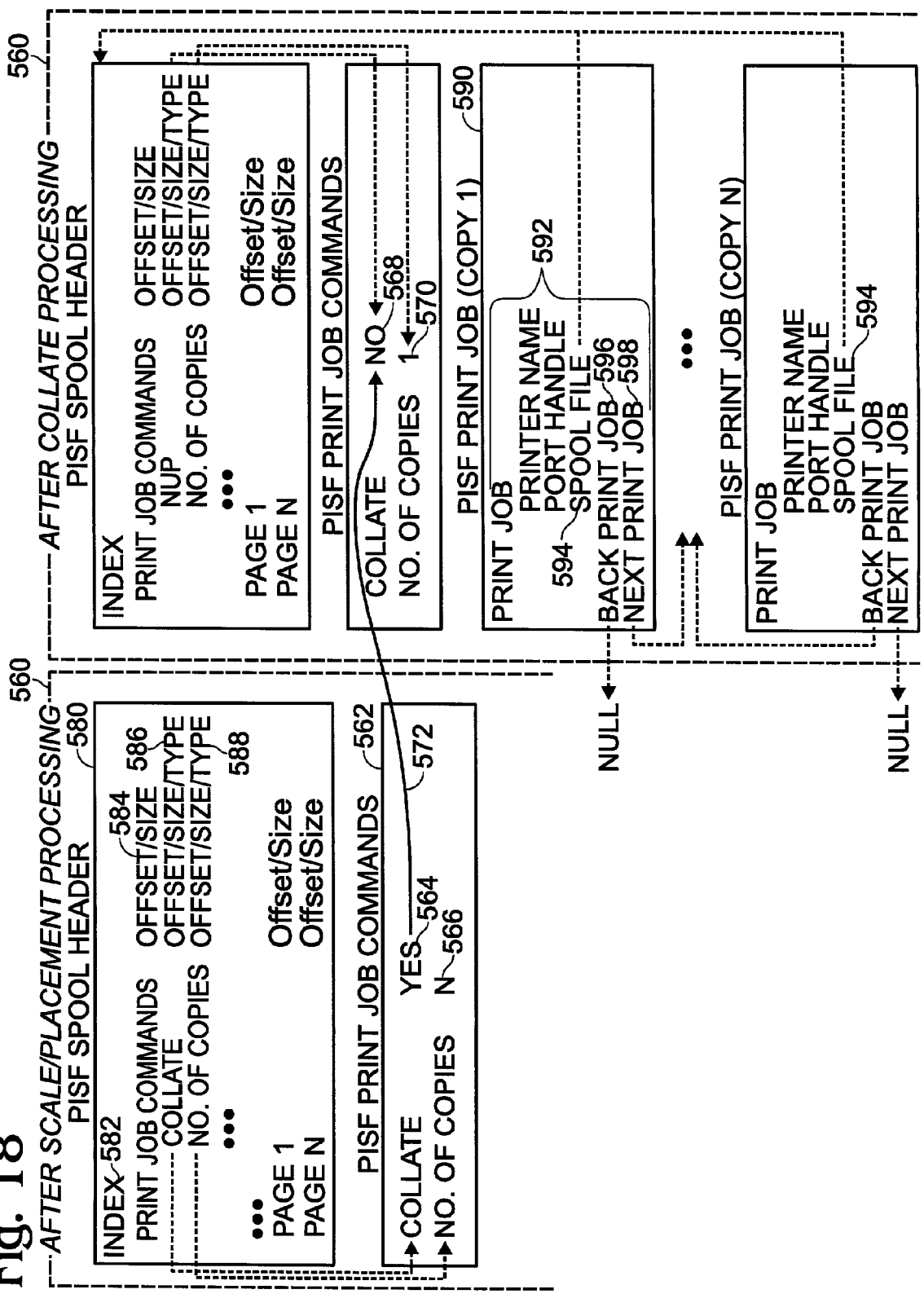
FIG. 18 is a diagram depicting a collate sheet assembly process of an embodiment of the present invention.

Once the PISF Spool Index is manipulated for Page Scale/Placement in OIFP embodiments, the PISF Spool Index file may be manipulated for sheet assembly options that change collation, such as group, collate and number of copies, when these options are specified by a user. These processes may be explained with reference to FIG. 18. To accomplish this, the PISF Spool Index file 560 may be manipulated to convey the number of passes over the Spool Data File and change 572 the Print Job Commands 562 for Collate 564 and the value of the Number of Copies 566 to Non-Collate 568 and 1 for the Number of Copies 570, respectively.

The PISF Spool Header 580 contains an index 582 to locate records within the PISF Spool Index file 560. The index contains information 584 for locating the Print Job Command record 562, the location, size and data type of the Collate 586 and Number of Copies 588 command index within the Print Job Command record 562.

This information is used to change the Print Job Command for Collate 564 to Non-Collate 568 in the PDL (or EMF) specific language format, and to change the Print Job Command for Number of Copies to 1 570.

A new PISF record, Print Job record 590, is introduced into the PISF Spool Index file 560. A Print Job record 590 is generated one per copy. Each Print Job record 590 contains an index 592, which contains information on the Printer Name, Port Handle, if any, and information for locating the respective Spool File and the previous and next Print Job record.

To accomplish collation and number of copies, the Spool File field 594 of each Print Job record points back to the same PISF Spool Header 580 within the PISF Spool Index file 560, and the Back 596 and Next 598 Print Job fields form a chain of N print jobs, where N is the number of copies. Note, that there is no disk duplication of the Spool Data, and no duplication of the PISF Spool Index file 560.

Some embodiments of the present invention used in conjunction with Windows NT/2000 systems may "fool" the system into processing a print job locally to enable some features of these embodiments. One method in which this may be done is by assigning a network device to a client parallel port, LPT1. This method makes the operating system believe it is printing to a local printer when output is actually redirected to a network device.

Some embodiments of the present invention comprise functionality which operates in conjunction with or as a part of a server's print processor.

The following explanation and code describe an exemplary embodiment of the present invention which enables booklet printing. In booklet printing, each sheet of paper consists of 4 pages; two pages on the front surface (left and right ½ face divided into 2 cells) and two pages on the back surface (left and right ½ face divided into 2 cells).

The booklet is constructed as, the first sheet contains the $1^{st}$ and $2^{nd}$ page on the left front and back face and the last and $2^{nd}$ to last page on the right front and back face.

The next sheet contains pages 3 and 4 on the left front and back face and the $3^{rd}$ and $4^{th}$ last page on the right front and back face (e.g., newspaper).

The first two sheets are a special case. If the total number of pages is not an even multiple of 4, then 4—(tPages mod 4) cells will be blank, and the blank cell(s) will appear on sheet one (tPages mod 4 equals 3) or sheet two (tPages mod 4 equals 1 or 2 ). The algorithm below computes the layout of the first two sheets, where SheetFL is front left, SheetBL is back left, SheetFR is front right, and SheetBR is back right.

---

\# Remaining pages that do not complete a booklet page ( not evenly divisible by 4 )
\#
pExtra = tPages mod 4
\# Number of double sided sheets needed to print this print job in Booklet form.

-continued

```

tSheets = tPages div 4 + ( pExtra ? 1 : 0 )
# Calculate the Number of Blank Faces

if ( pExtra )
      pBlank = 4 − pExtra
else
      pBlank = 0
# Special Case: Sheet 1
# Outer Left Cell of 1st Sheet has the 1st page.

pjSheetFL(1) = Scale(pjPage(1), ½ )
# If the total number of pages is less than or equal to 4, we only have one sheet in the
# booklet.

if ( tPages <= 4 )
      # If we have at least 2 pages, the Inside Left Cell has the 2nd page.
      #
      if ( tPages > 1 )
            pjSheetBL(1) = Scale( pjPage( 2 ), ½ )
      # If we have at least 3 pages, the Inside Right Cell has the 3rd page.
      #
      if ( tPages > 2 )
            pjSheetBR(1) = Scale( pjPage( 3 ), ½ )
      # If we have 4 pages, the Outer Right Cell has the 4th page.
      #
      if ( tPages > 3 )
            pjSheetFR(1) = Scale( pjPage( 4 ), ½ )
# The print job has at least 2 sheets in booklet form

else
      # Inner Left Cell of 1st Sheet has the 2nd page.
      #
      pjSheetBL(1) = Scale( pjPage( 2 ), ½ )
      # Complete Layout of the 1st Sheet, depending on whether the number of pages
      # is evenly divisible by 4 for booklet. If not, the blank cells will appear either on
      # the 1st or 2nd sheet, depending on the number of remaining pages.
      #
      switch ( pExtra )
      # No remaining pages:
      # Outer Right Cell of the 1st Sheet has the last page
      # Inner Right Cell of the 1st Sheet has the 2nd to last page
      #
      case 0
            pjSheetFR(1) = Scale( pjPage( tPages ), ½ )
            pjSheetBR(1) = Scale( pjPage( tPages − 1), ½ )
      # One remaining page:
      # The Outer and Inner Right Cells of the 1st Sheet are blank
      #
      case 1
            // nothing
      # Two remaining pages:
      # The Outer and Inner Right Cells of the 1st Sheet are blank
      #
      case 2
            // nothing
      # Three remaining pages:
      # Inside Right Cell of 1st Sheet has the last page. Outer Right Cell is blank.
      #
      case 3
            pjSheetBR(1) = Scale( pjPage( tPages ), ½ )
      # Special Case: Sheet 2
      # Outer Left Cell of 2nd Sheet has 3rd page.
      # Inner Left Cell of 2nd Sheet has 4th page.
      #
      pjSheetFL(2) = Scale( pjPage(3), ½ )
      pjSheetBL(2) = Scale( pjPage(4), ½ )
      # If the total number of pages is less than or equal to 8, we only have two sheets
      # in the booklet.
      #
      if ( tPages <= 8 )
            # If we have at least 5 pages, the Inside Right Cell has the 5th page.
            #
            if ( tPages > 4 )
                  pjSheetBR(2) = Scale( pjPage( 5 ), ½ )
            # If we have at least 6 pages, the Outside Right Cell has the 6th page.
            #
            if ( tPages > 5 )
                  pjSheetFR(2) = Scale( pjPage( 6 ), ½ )
```

```
# The print job has more than 2 sheets in booklet form

else
    # Complete Layout of the 2nd Sheet, depending on whether the number
    # of pages is evenly divisible by 4 for booklet. If not, the blank cells
    # will appear either on the 1st or 2nd sheet, depending on the number of
    # remaining pages.
    #
    switch ( pExtra )
        # No remaining pages:
        # Outer Right Cell of 2nd Sheet has the 2nd to last page.
        # Inner Right Cell of 2nd Sheet has the 3rd to last page.
        #
        case 0
            pjSheetBR(2) = Scale ( pjPage( tPages – 3 ), ½ )
            pjSheetFR(2) = Scale( pjPage( tPages – 2 ), ½ )
        # One remaining page:
        # Inner Right Cell of 2nd Sheet has the last page.
        # Outer Right Cell of 2nd Sheet is blank.
        #
        case 1
            pjSheetBR(2) = Scale( pjPage( tPages), ½ )
        # Two remaining pages:
        # Outer Right Cell of 2nd Sheet has the last page.
        # Inner Right Cell of 2nd Sheet has the 2nd to last page.
        #
        case 2
            pjSheetFR(2) = Scale( pjPage( tPages ), ½ )
            pjSheetBR(2) = Scale( pjPage( tPages – 1), ½ )
        # Three remaining pages:
        # Outer Right Cell of 2nd Sheet has the 2nd to last page.
        # Inner Right Cell of 2nd Sheet has the 3rd to last page
        #
        case 3
            pjSheetFR(2) = Scale( pjPage( tPages – 1 ), ½ )
            pjSheetBR(2) = Scale( pjPages( tPages – 2 ), ½ )
Below is the computation for the placement of pages on the remaining sheets (i.e., sheets
3 .. tSheets ).
# Sheets 3 .. tSheets
# Layout the remaining sheets in Booklet form.
# Each Sheet has 4 cells.
# The left cells are in sequential order, starting from the beginning, in groups of 2.
# The right cells are in reverse sequential order, starting from the end, in groups of 2.

for j = 3 .. tSheets
    # Outside Left Cell has 1st page in next group of 2 from the beginning.
    #
    pjSheetFL(j) = Scale( pjPage( ( j – 1) * 2 + 1), ½ )
    # Inside Left Cell has 2nd page in next group of 2 from the beginning.
    #
    pjSheetBL(j) = Scale( pjPage( (j – 1 ) * 2 + 2), ½ )
    # Inside Right Cell has 1st page in group of 2 from the end, offset by the
    # number of blank cells ( tPages mod 4 not zero ).
    #
    pjSheetBR(j) = Scale( pjPage( ( tPages + pBlank) – ( ( j – 1 ) * 2 ) – 1 ), ½ )
    # Outside Right Cell has 2nd page in group of 2 from the end, offset by the
    # number of blank cells ( tPages mod 4 not zero ).
    #
    pjSheetFR(j) = Scale( pjPage( ( tPages + pBlank ) – ( ( j – 1 ) * 2 ) ), ½ )
    # Open Printer to print pages in print job in booklet form
    #
    OpenPrinter(i)
    # Print each booklet sheet in print job
    #
    for j = 1 .. tSheets
        WritePrinter(i, pjSheet(j) )
    # Close printer to complete print job
    #
    ClosePrinter(i)
```

Other embodiments of the present invention may be used in conjunction with or as a part of the spooling and despooling subsystems of the Apple MacIntosh Operating System, Linux Operating System, System V Unix Operating Systems, BSD Unix Operating Systems, OSF Unix Operating Systems, and IBM Mainframe MvS Operating System, as well as other operating systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing driver-independent, printer-independent page manipulation options in a printing system through a page-independent spool file index, said method comprising:
    reading a spool data file for a document;
    creating a Page-Independent Spool File (PISF) index file that is distinct from said spool data file, but based on data in said spool data file, wherein said PISF index file comprises a link to said spool data file, wherein said link identifies a portion of said spool data file required to print an independently-formatted page of said document;
    manipulating said PISF index file, after creation of said PISF index file, to effect a document page format manipulation option, wherein said document page format manipulation option is selected from the group consisting of page order, page copies, page scaling and page placement, thereby producing a manipulated PISF index file; and
    using a print processor customized to use said manipulated PISF index file, generating printer-ready data, for a modified document created via said page format manipulation, from portions of said spool data file identified by said manipulated PISF index file.

2. The method of claim 1 further comprising providing a user interface for user manipulation of said PISF index file, after creation of said index file, to effect said document page format manipulation option.

3. The method of claim 1 wherein said PISF index file comprises indices to distinct spool data chunks corresponding to the sequential order: Print Job Header, the front and back of each sheet of the document and the Print Job Footer.

4. The method of claim 1 wherein global, persistent commands in said spool data file are allocated to page-specific units in said PISF index file.

5. The method of claim 1 wherein said using a print processor comprises Ordered Index File Processing wherein said PISF index file is modified to effect document output changes in the order: 1) page order, 2) page scale and placement, and 3) sheet collation.

6. The method of claim 1 wherein said PISF index file comprises information for locating a Print Job Command record, which comprises a location, size and data type of a Collate and Number of Copies command index.

7. The method of claim 1 wherein said PISF index file comprises a Face record for each side of a page in said document.

8. The method of claim 1 wherein said PISF index file is created by a print system component other than the component that creates said spool data file.

9. The method of claim 1 wherein said manipulation of said PISF index file comprises changing collation options.

10. A method for performing document formatting options in a printing system, said method comprising:
    manipulating a PISF index file to effect document formatting, wherein said document formatting comprises a document page format manipulation option, wherein said document page format manipulation option is selected from the group consisting of page order, page copies, page scaling and page placement, after creation of said PISF index file, wherein said PISF index file comprises a link to a spool data file, wherein said link identifies a portion of said spool data file required to print a first independently-formatted page corresponding to a page of said document, wherein said first independently-formatted page is based on document-wide, persistent, page formatting data in said spool data file, thereby producing a manipulated PISF index file; and
    using a print processor customized to use said manipulated PISF index file, generating printer-ready data for said page from portions of said spool data file identified by said manipulated PISF index file.

11. The method of claim 10 wherein said manipulating comprises changing the order of a page in said document.

12. The method of claim 10 wherein said PISF index file comprises indices to distinct spool data chunks corresponding to the sequential order: Print Job Header, the front and back of each sheet of the document and the Print Job Footer.

13. The method of claim 10 wherein global, persistent commands in said spool data file are allocated to page-specific units in said PISF index file.

14. A method for obtaining page-independent print data in a printing system, said method comprising:
    reading a PISF index file that is separate from a spool data file, wherein said PISF index file comprises a link to said spool data file, wherein said link identifies a portion of said spool data file required to print an independently-formatted, page, wherein said independent formatting is derived from document-wide, persistent, page formatting data in said spool data file; and
    using a print processor customized to use said PISF index file, accessing data indexed in said PISF index file to print said page.

15. The method of claim 14 wherein said PISF index file is produced by a print processor.

16. The method of claim 14 wherein said PISF index file comprises indices to distinct spool data chunks corresponding to the sequential order: Print Job Header, the front and back of each sheet of the document and the Print Job Footer.

17. The method of claim 14 wherein said PISF index file is produced by a print system component in a print system between a driver and a printer.

18. A printing system with driver-independent, printer-independent document formatting, said system comprising:
    a reader for reading a spool data file for a document;
    an indexer for converting document-wide, persistent, page formatting data in said spool data file into a page-independent spool file (PISF) index file comprising a link to said spool data file, wherein said link identifies a first portion of said spool data file required to print an independently-formatted, page; and
    a customized print processor capable of interfacing with said PISF index file to generate printer-ready data corresponding to said page from portions of said spool data file identified in said PISF index file.

19. A computer-readable medium comprising computer-executable instructions for creating printer-ready data, said instructions comprising the acts of:

reading a spool data file for a document;

creating a Page-Independent Spool File (PISF) index file that is distinct from said spool data file, but based on data in said spool data file, wherein said PISF index file comprises a link to said spool data file, wherein said link identifies a first portion of said spool data file required to print a first independently-formatted page of said document;

manipulating said PISF index file, after creation of said PISF index file, to effect a document page format manipulation option, wherein said document page format manipulation option is selected from the group consisting of page order, page copies, page scaling and page placement, thereby producing a manipulated PISF index file; and using a print processor customized to use said manipulated PISF index file, generating printer-ready data for said page from portions of said spool data file identified by said manipulated PISF index file.

* * * * *